(12) United States Patent
Belisle et al.

(10) Patent No.: US 6,796,004 B2
(45) Date of Patent: Sep. 28, 2004

(54) EXHAUST SYSTEM CLAMP

(75) Inventors: John I. Belisle, Hampton, MN (US); Wayne M. Wagner, Apple Valley, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 10/462,009

(22) Filed: Jun. 12, 2003

(65) Prior Publication Data

US 2004/0068847 A1 Apr. 15, 2004

Related U.S. Application Data

(63) Continuation-in-part of application No. 09/953,401, filed on Sep. 14, 2001, now Pat. No. 6,634,607.
(60) Provisional application No. 60/416,195, filed on Oct. 3, 2002.

(51) Int. Cl.⁷ .......................... F16L 21/06; F16L 33/04
(52) U.S. Cl. ............................. 24/279; 285/419
(58) Field of Search ....................... 24/201.5, 284, 24/285, 286, 279; 285/419, 114.26; 248/74.1, 74.3

(56) References Cited

U.S. PATENT DOCUMENTS

| | | |
|---|---|---|
| 848,139 A | 3/1907 | Stuppar |
| 852,997 A | 5/1907 | Brandram |
| 973,466 A | 10/1910 | Beegen |
| 1,146,813 A | 7/1915 | Peterman et al. |
| 2,004,182 A | 6/1935 | Arey |
| 2,227,551 A | 1/1941 | Morris |
| 2,690,193 A | 9/1954 | Smith |
| 2,828,525 A * | 4/1958 | Gail ............................ 24/279 |
| 2,908,061 A | 10/1959 | Adams |
| 2,998,629 A | 9/1961 | Smith |
| 3,004,781 A | 10/1961 | Morris |
| 3,565,468 A | 2/1971 | Garrett |
| 3,905,623 A | 9/1975 | Cassel |
| 3,944,265 A | 3/1976 | Hiemstra et al. |
| 4,049,298 A | 9/1977 | Foti |
| 4,056,273 A | 11/1977 | Cassel |
| 4,142,743 A | 3/1979 | McGowen et al. |
| RE30,042 E | 7/1979 | Hiemstra et al. |
| 4,165,109 A | 8/1979 | Foti |
| 4,261,600 A | 4/1981 | Cassel |
| 4,312,526 A | 1/1982 | Cassel |
| 4,364,588 A | 12/1982 | Thompson |
| 4,365,392 A | 12/1982 | Heckethorn |
| 4,408,788 A | 10/1983 | Beukema |
| 4,463,975 A | 8/1984 | Mccord |
| 4,558,891 A | 12/1985 | Wagner et al. |
| 4,790,574 A | 12/1988 | Wagner et al. |
| 4,813,720 A | 3/1989 | Cassel |
| 5,010,626 A * | 4/1991 | Dominguez ................ 24/279 |
| 5,116,083 A | 5/1992 | Gillingham et al. |
| 5,720,086 A * | 2/1998 | Eliasson et al. ............. 24/279 |
| 6,116,659 A | 9/2000 | Wagner |
| 6,269,524 B1 * | 8/2001 | Cassel ....................... 24/279 |

FOREIGN PATENT DOCUMENTS

GB 373678 6/1932

* cited by examiner

*Primary Examiner*—Robert J. Sandy
(74) *Attorney, Agent, or Firm*—Merchant & Gould P.C.

(57) ABSTRACT

Clamps for sealing lap joints are disclosed. The clamps include bands each having a main body and bolts mounting flanges located at opposite ends of the main body. Sealing bars are mounted between the bolt mounting flanges of the bands. The sealing bars includes pockets for receiving portions of the mounting flanges. The pockets are defined by sealing legs and reaction legs of the sealing bar.

24 Claims, 23 Drawing Sheets

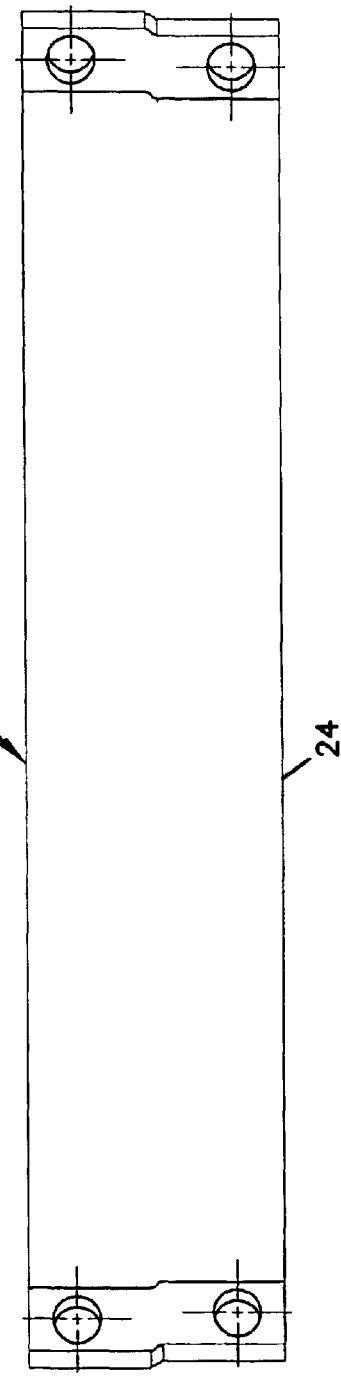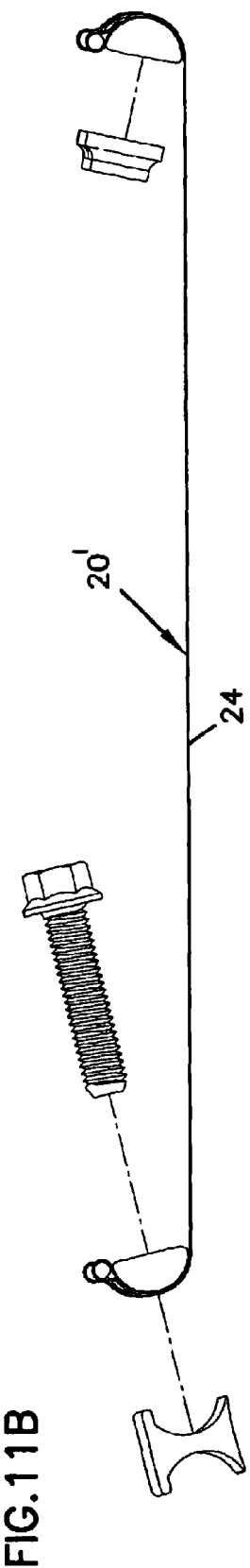
FIG.11A
FIG.11B

FIG. 15
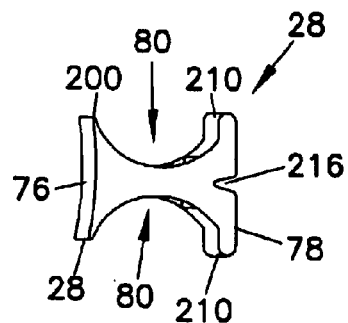
FIG. 16
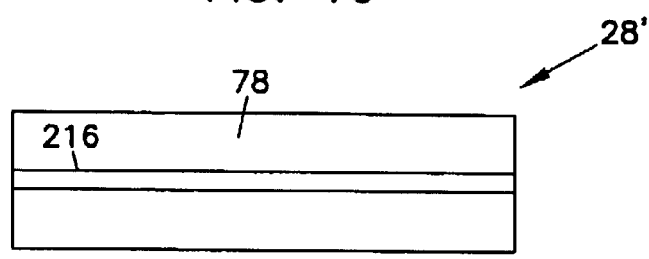
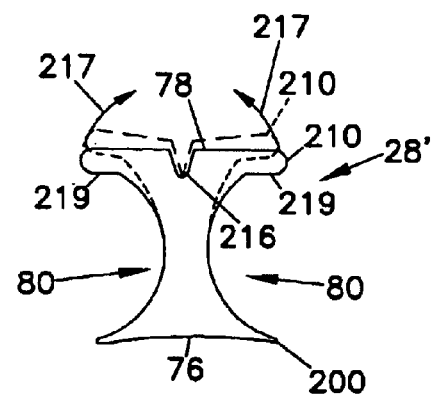
FIG. 17

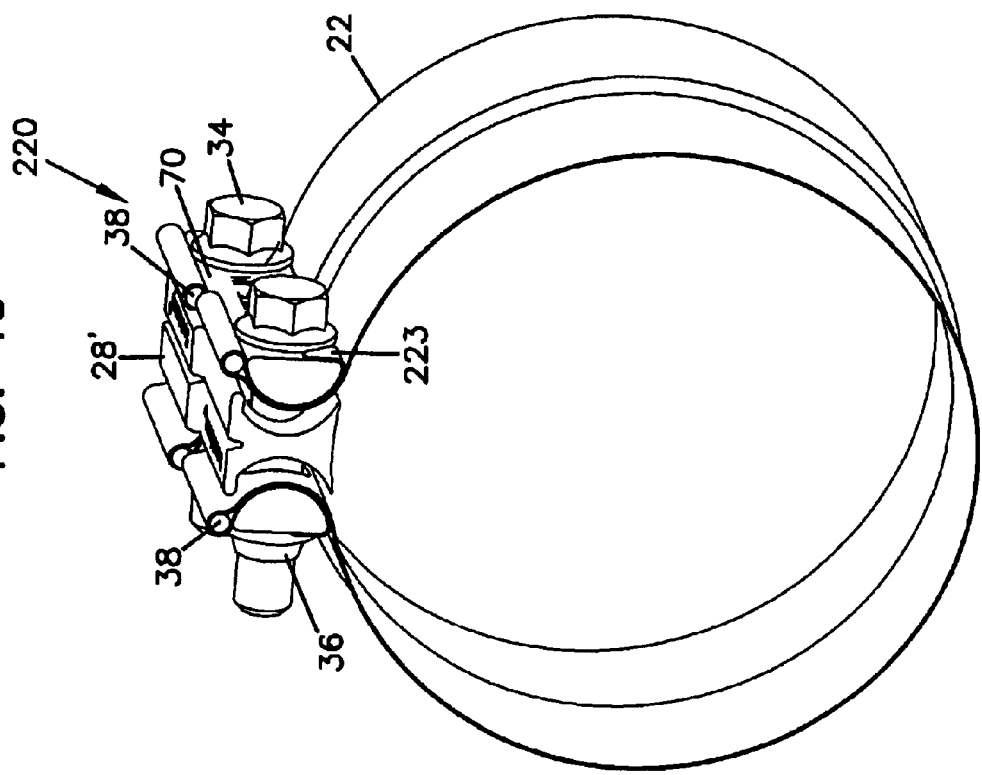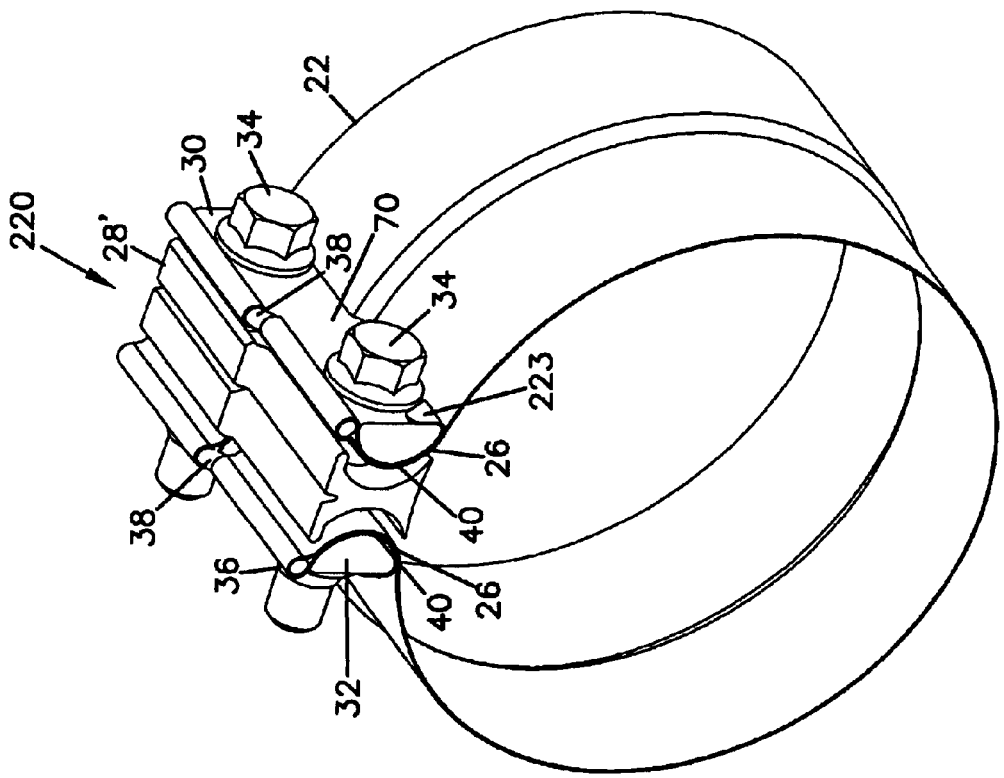

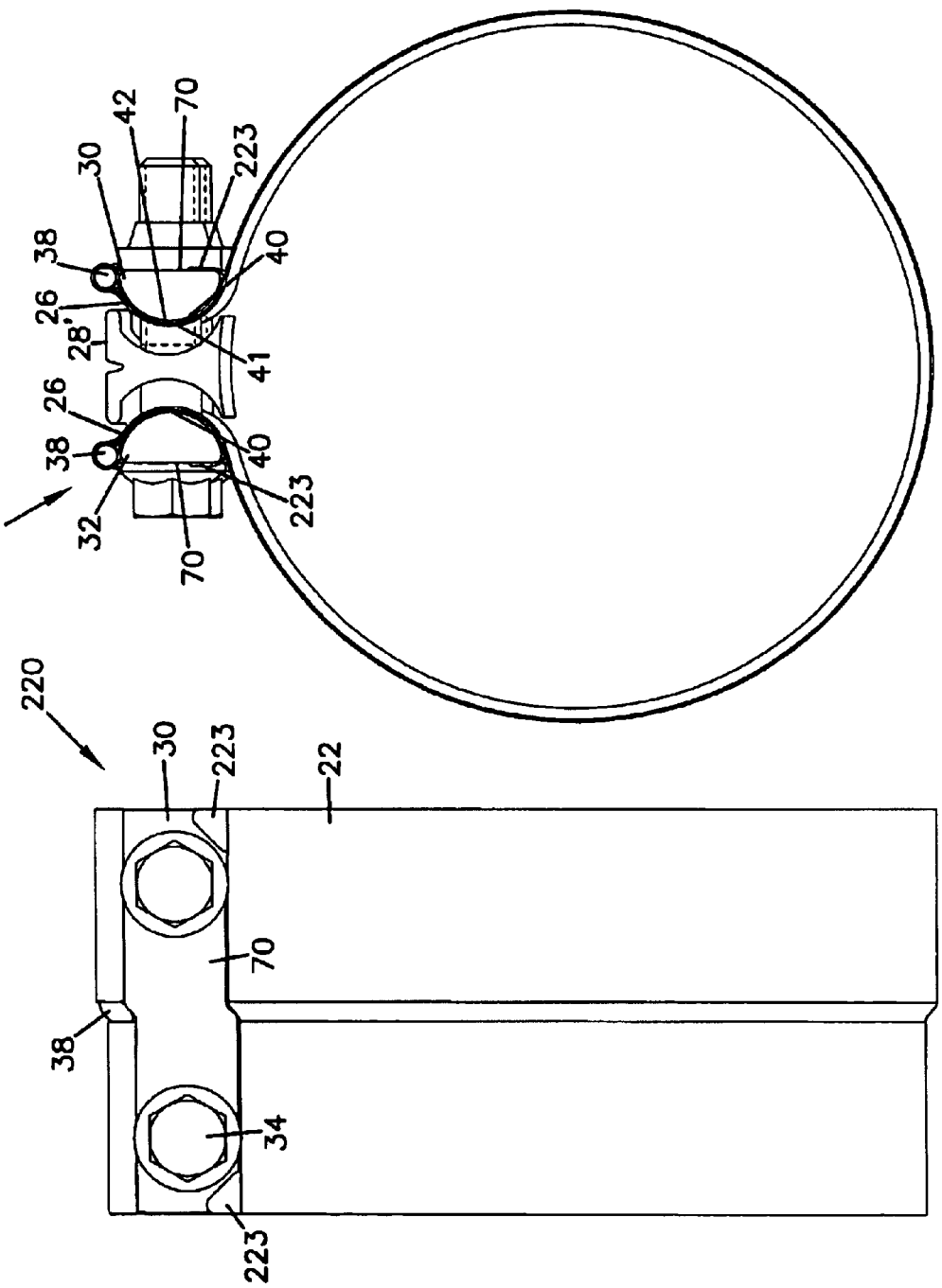

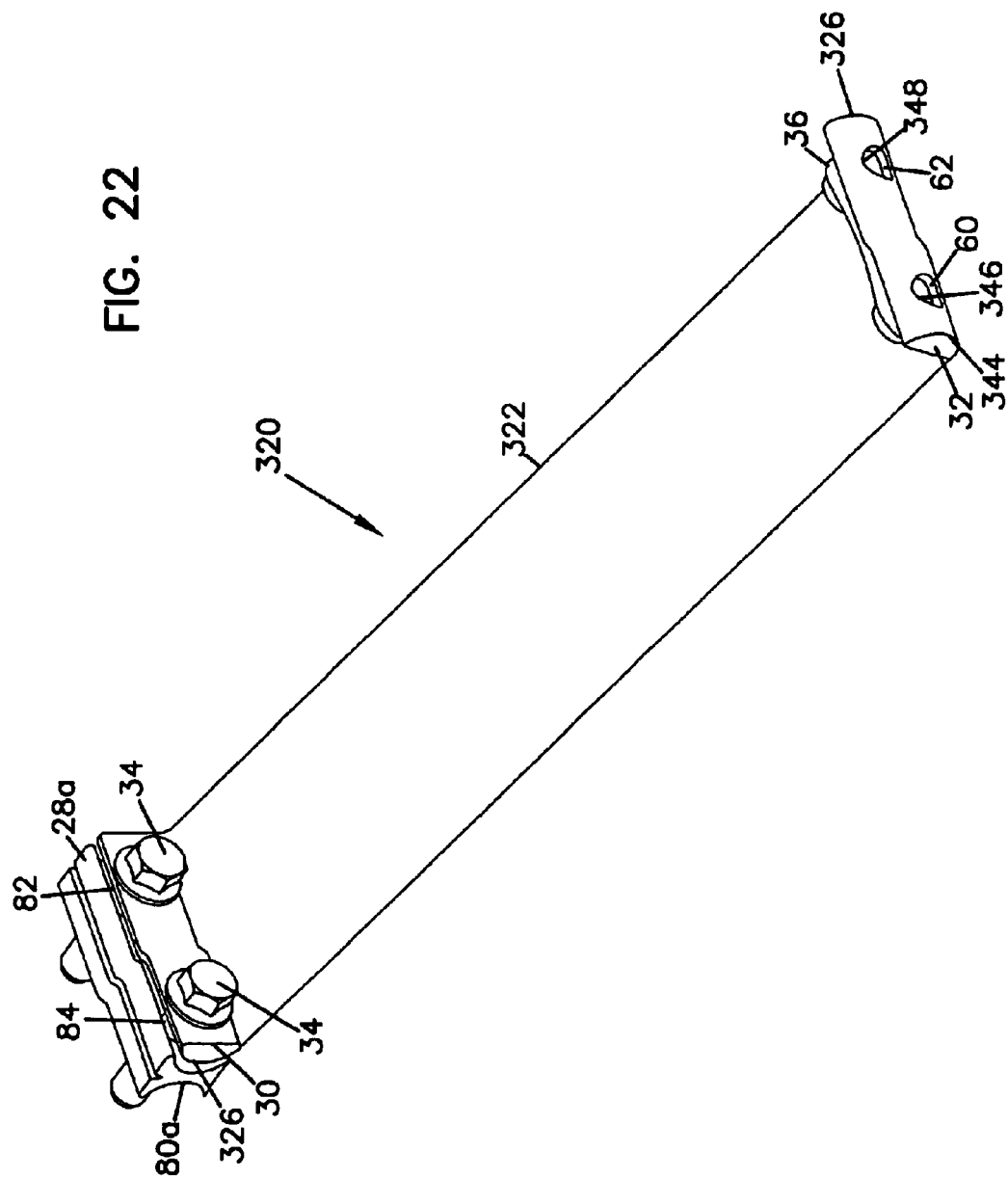

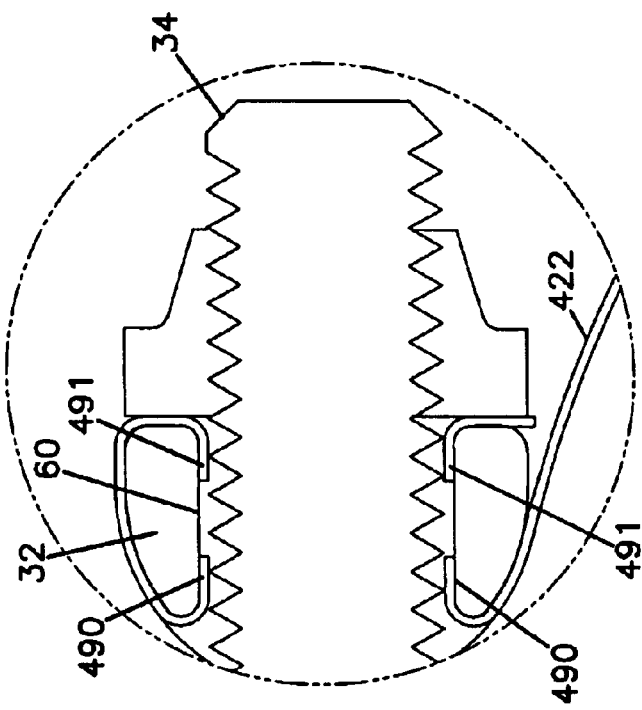
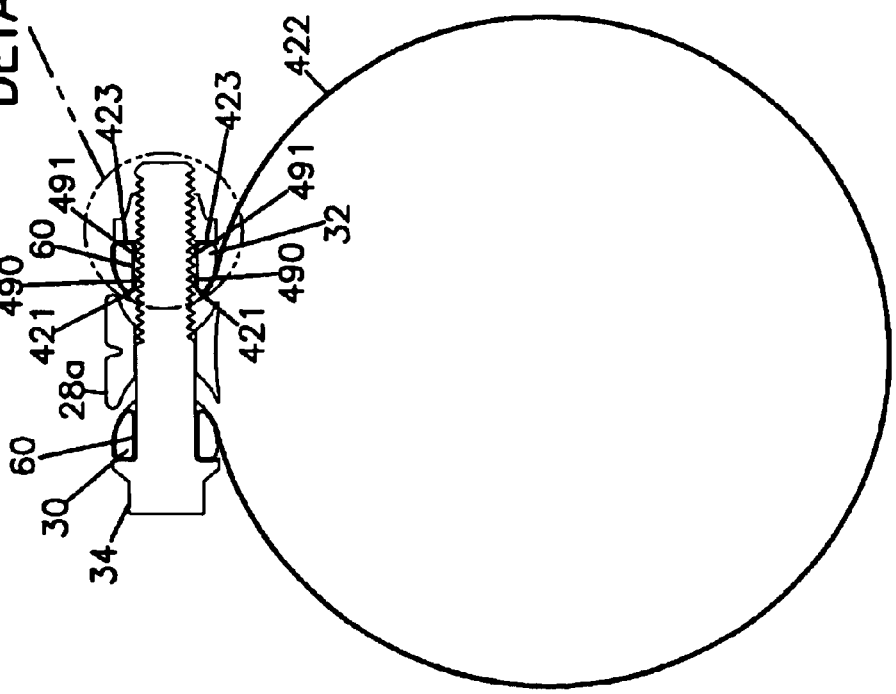

EXHAUST SYSTEM CLAMP

CROSS-REFERENCE TO RELATED APPLICATIONS

This application claims the benefit of U.S. provisional application Ser. No. 60/416,195 filed Oct. 3, 2002, and is also a continuation-in-part of U.S. application Ser. No. 09/953,401 filed Sep. 14, 2001, now U.S. Pat. No. 6,634,607, both of which are hereby incorporated by reference.

TECHNICAL FIELD

The present invention relates generally to clamps. More particularly, the present invention relates to clamps used to seal lap joints of a vehicle exhaust system.

BACKGROUND

There are many applications where it is desirable to connect two conduits (e.g., tubes, pipes, flexible hose, ducts, etc.) together. One common application is vehicle exhaust systems. In vehicle exhaust systems, two conduits are often connected at a "lap joint." A "lap joint" is formed by inserting the end of one conduit into the end of another conduit such that the ends overlap one another. A clamp is then placed around the overlapped ends of the conduits. The clamp preferably functions to seal the lap joint and to mechanically connect the two conduits together such that the two conduits are prevented from being pulled apart.

Numerous patents exist relating to clamps used for vehicle exhaust systems. Some example patents relating to this field include U.S. Pat. No. 4,312,526 to Cassel, U.S. Pat. No. 4,813,720 to Cassel, U.S. Pat. No. 6,116,659 to Wagner, U.S. Pat. No. 4,790,574 to Wagner et al. and U.S. Pat. No. 5,116,083 to Gillingham et al.

SUMMARY OF THE INVENTION

The present invention relates to clamps for sealing lap joints that include fastening arrangements having fasteners that extend through sealing bars and outer reinforcing bars.

A variety of advantages of the invention will be set forth in part in the description that follows, and in part will be apparent from the description, or may be learned by practicing the invention. It is to be understood that both the foregoing general description and the following detailed description are exemplary and explanatory only and are not restricted.

BRIEF DESCRIPTION OF THE DRAWING

FIGS. 11A and 11B illustrate an alternative clamp that is an embodiment of the present invention;

FIG. 15 is an end view of the sealing bar of FIG. 13.

FIG. 16 is a top view of the sealing bar of FIG. 13;

FIG. 17 is an end view showing the sealing bar after deformation;

FIG. 18 is a perspective view of another clamp having features that are examples of inventive aspects disclosed herein;

FIG. 19 is another perspective view of the clamp of FIG. 18;

FIG. 20 is a side view of the clamp of FIG. 18;

FIG. 21 is an end view of the clamp of FIG. 18;

FIG. 22 is a perspective view of a further clamp having inventive features that are examples of inventive aspects disclosed herein;

FIG. 28 is a cross-sectional view taken along one of the bolts of the clamp of FIG. 26; and FIG. 28A is an enlarged view of a portion of FIG. 28.

Figure 1C:
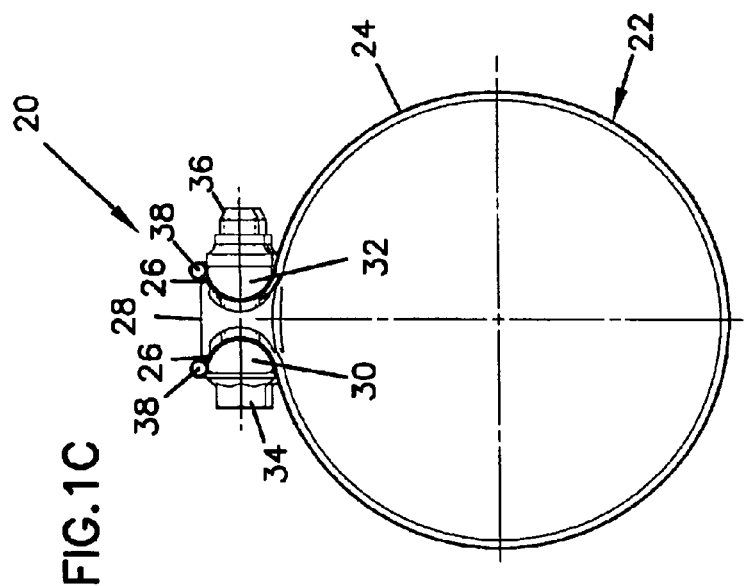
FIG. 1C is a right end view of the clamp of FIG. 1A.

While the invention is amenable to various modifications and alternative forms, the specifics thereof have been shown by way of example in the drawings and will be described in detail below. It is to be understood, however, that the intention is not to limit the invention to the particular embodiments described. On the contrary, the invention is intended to cover all modifications, equivalents and alternatives falling within the scope of the invention as defined by the appended claims.

DETAILED DESCRIPTION

In the following detailed description, references are made to the accompanying drawings that depict various embodiments in which the invention may be practiced. It is to be understood that other embodiments may be utilized, and structural and functional changes may be made without departing from the scope of the present invention. Further, each of the features disclosed herein can be considered stand alone inventive features or features that have inventive aspects when considered in combination with one another. In the various embodiments, like parts have been assigned the same reference numbers.

I. General Clamp Description

Figure 1B:
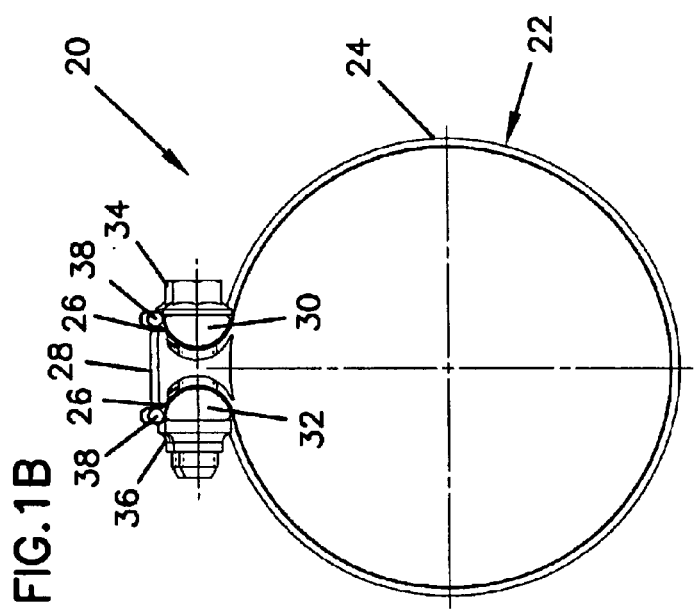
FIG. 1B is a left end view of the clamp of FIG. 1A.
Figure 1A:
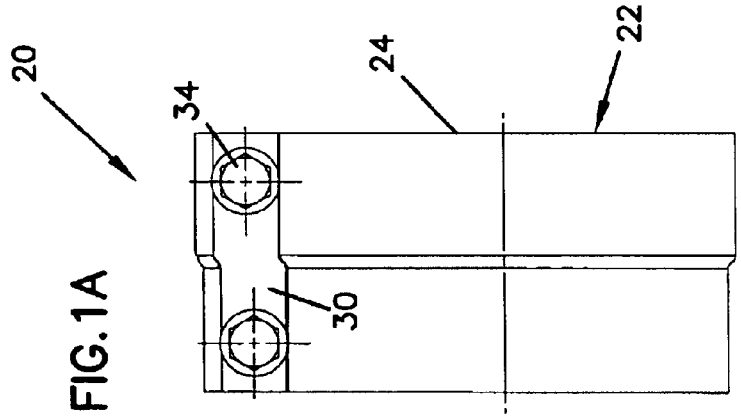
FIG. 1A is a side view of a clamp that is an embodiment of the present invention.

FIGS. 1A–1C illustrate a clamp 20 that is an embodiment of the present invention. The clamp includes a band 22 having a cylindrical main body 24 and bolt mounting flanges 26 that project radially outwardly from the main body 24. Retaining bars 38 are mounted at the tops of the flanges 26. A sealing bar 28 is positioned between the bolt mounting flanges 26, and outer reinforcing bars 30 and 32 are positioned outside the bolt mounting flanges 26. Two bolts 34 extend through coaxially aligned openings defined by the bolt mounting flanges 26, the sealing bar 28 and the outer reinforcing bars 30 and 32 such that the components are fastened together. The bolts 34 are threaded within a nut bar 36 positioned outside the outer reinforcing bar 32.

II. Piece-Part Clamp Description a. Band Description

Referring to FIGS. 2A–2D, the band 22 of the clamp 20 is shown. The band 22 is preferably made of a relatively thin, ductile metal material such as stainless steel or aluminized steel. It will be appreciated that the diameter, the wall thickness and the axial length of the band 22 will vary based on intended use. In one non-limiting embodiment of the present invention, the band 22 is made of stainless steel and has a wall thickness in the range of 0.013–0.023 inches.

Figure 2B:
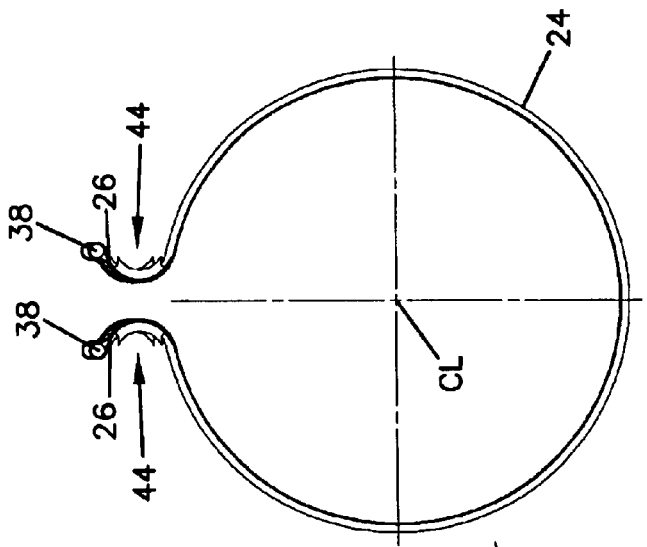
FIG. 2B is a left end view of the clamp of FIG. 2A.

Referring to FIG. 2B, the main body 24 of the band 22 is pre-formed into a generally cylindrical shape, and the bolt mounting flanges 26 are located at opposite ends of the main body 24. The bolt mounting flanges 26 are formed by doubled over portions of the band 22. For example, as best shown in FIG. 2C, each of the bolt mounting flanges 26 is formed by bending the band 22 around one of the retaining bars 38 to form a doubled over portion including an inner wall 40 and an outer wall 42. The bolt mounting flanges 26 are then bent (e.g., through a die forming process) to define outwardly facing concave pockets 44 sized to receive the outer reinforcing bars 30 and 32.

Figure 2A:
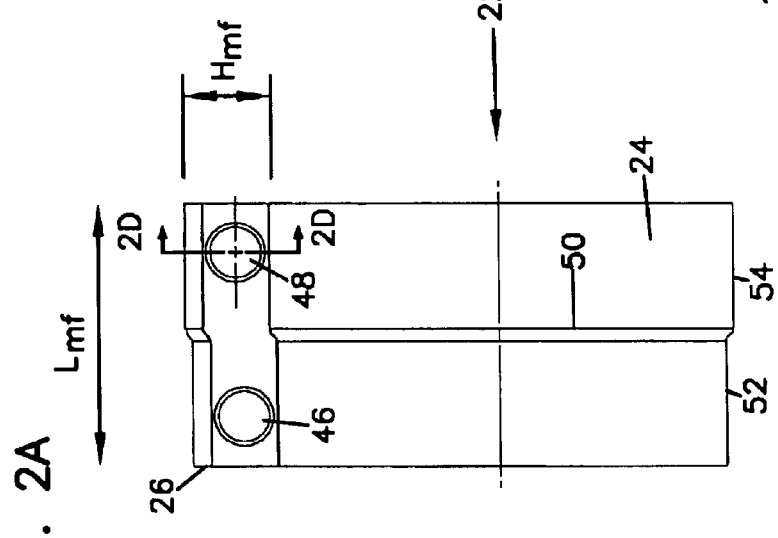
FIG. 2A is a side view of the clamp of FIG. 1A with the fastening hardware removed.
Figure 2C:
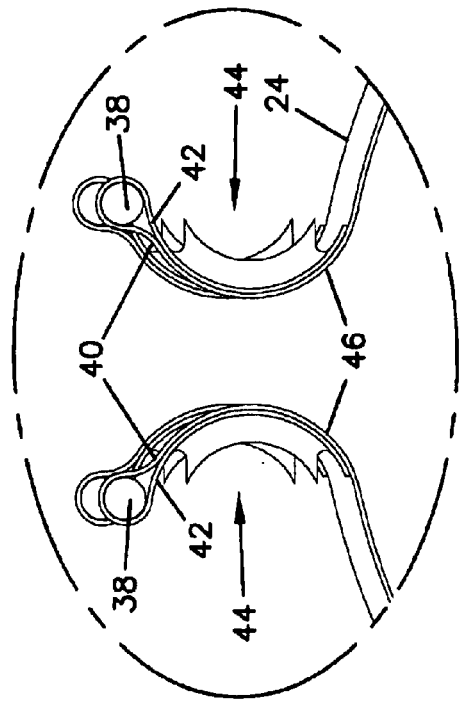
FIG. 2C is a detailed view of the flange region of the clamp of FIG. 2B.
Figure 2D:
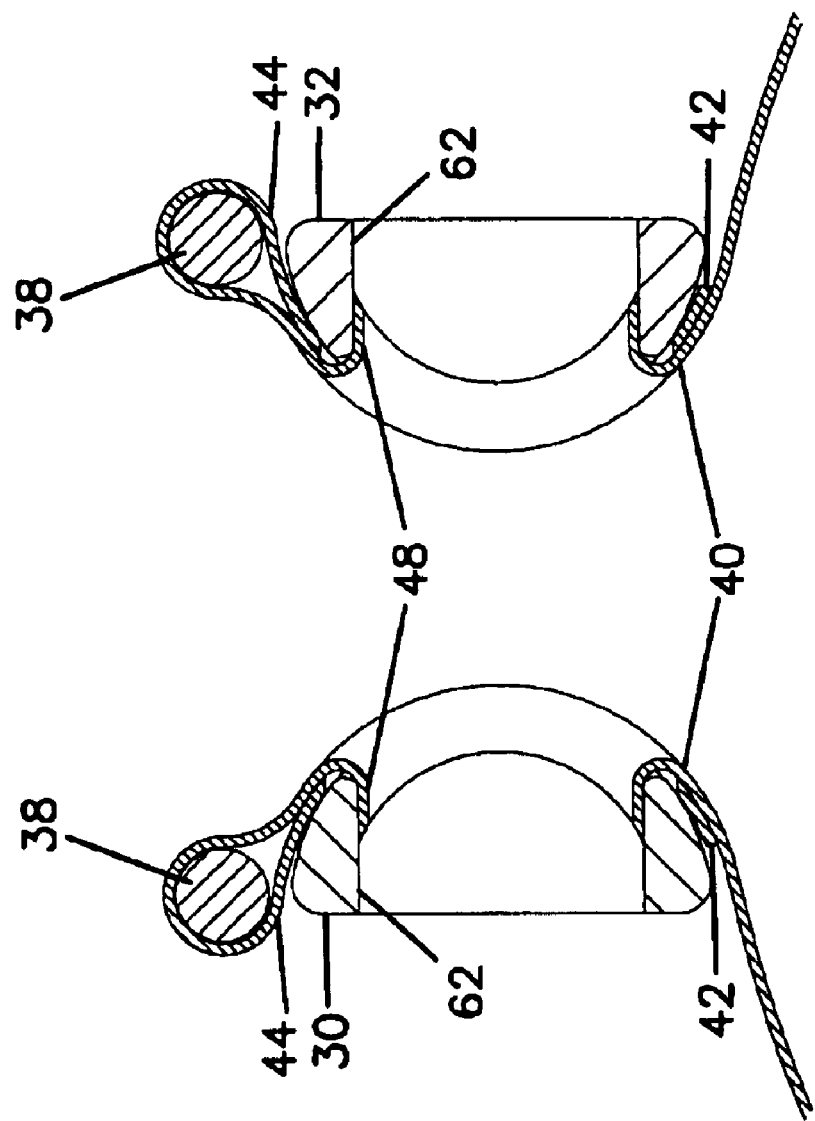
FIG. 2D is a cross-sectional view taken along section line 2D—2D of FIG. 2A.

Referring now to FIG. 2A, the bolt mounting flanges 26 each include a length $L_{mf}$ and a height $H_{mf}$. The length $L_{mf}$ corresponds to the axial length of the clamp 20 and the height $H_{mf}$ extends generally in a radial direction with respect to a center line CL of the clamp 20. Two sets of bolt openings 46 and 48 are defined through the bolt mounting flanges 26. The bolt openings 46 and 48 are preferably sized to receive the bolts 34 with a conventional clearance fit. The bolt openings 46 and 48 are spaced apart along the length $L_{mf}$ of each bolt mounting flange 26 and are staggered in a direction corresponding to the height $H_{mf}$ of each bolt mounting flange 26 (see FIG. 2A).

Referring still to FIG. 2A, a step 50 is shown extending about the circumference of the main body 24 of the band 22. The step 50 is located generally at a mid point of the axial length of the clamp 20, and has a height dimensioned to correspond generally to the wall thickness of a pipe 130 or other conduit over which the clamp 20 is intended to be mounted (see FIG. 10). The amount of stagger provided between the bolt openings 46 and 48 corresponds generally to the height of the step 50. Preferably, the bolt openings 46 and 48 are centered generally along the height $H_{mf}$ of each bolt mounting flange 26. It will be appreciated that the staggering of the bolt openings 46 and 48 is preferably provided in a radial direction relative to the center line CL of the clamp 20.

The step 50 preferably extends about the entire circumference of the main body 24 of the band 22. The step 50 provides a diameter transition between a smaller diameter portion 52 and a larger diameter portion 54 of the band 22.

b. Outer Reinforcing Bar Description

FIGS. 3A–3B and 4A–4D respectively illustrate the outer reinforcing bars 30 and 32 of the clamp 20. Each of the outer reinforcing bars 30 and 32 includes a height $H_{rb}$ and a length $L_{rb}$. Each of the outer reinforcing bars 30 and 32 also defines two bolt openings 60 and 62 adapted to respectively align with the sets of bolt openings 46 and 48 defined by the bolt mounting flanges 26 of the clamp 20. The bolt openings 60 and 62 are staggered in a direction corresponding to the height $H_{rb}$. The staggering is provided by a height offset 64 positioned between the bolt openings 60 and 62. The height offset 64 includes first and second steps 66 and 68 separated by the height $H_{rb}$ of the outer reinforcing bars 30 and 32. Each of the outer reinforcing bars 30 and 32 also includes a generally flat surface 70 adapted to face outwardly from the clamp 20, and a convex surface 72 having a curvature and size selected to nest within and complement the curvature of the concave pockets 44 of the bolt mounting flanges 26. The height offset 64 is preferably positioned such that when the outer reinforcing bars 30 and 32 are mounted on the clamp 20, the height offset 64 aligns generally with the step 50 formed in the band 22.

Figure 3D:
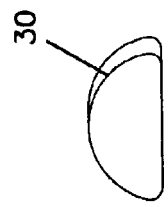
FIG. 3D is a left end view of the outer reinforcing bar of FIG. 3A.
Figure 3A:
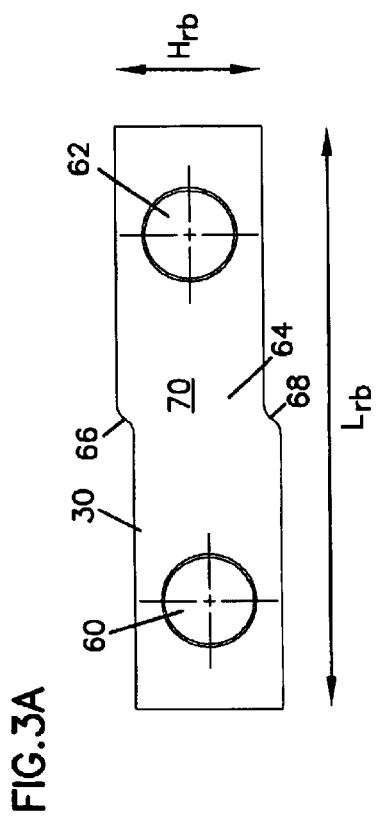
FIG. 3A is a front side view of a first outer reinforcing bar of the clamp of FIG. 1A.
Figure 3B:
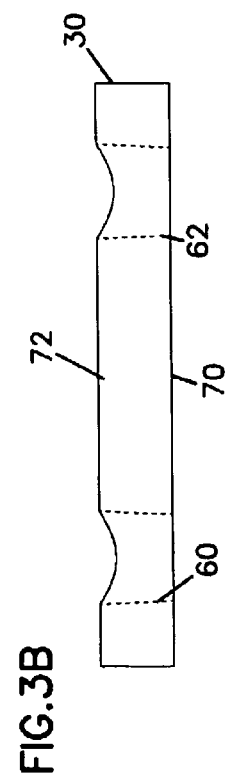
FIG. 3B is a top view of the outer reinforcing bar of FIG. 3A.
Figure 3C:
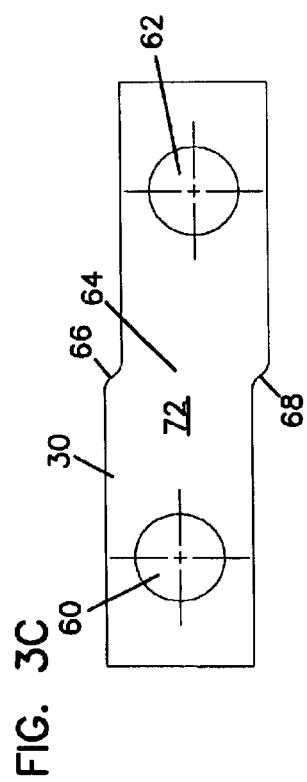
FIG. 3C is a backside view of the outer reinforcing bar of FIG. 3A.
Figure 4D:
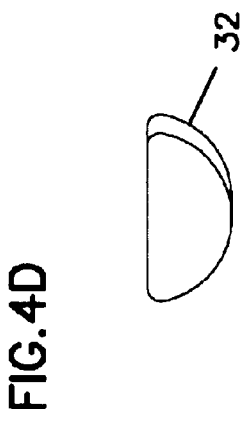
FIG. 4D is a left end view of the outer reinforcing bar of FIG. 4A.
Figure 4A:
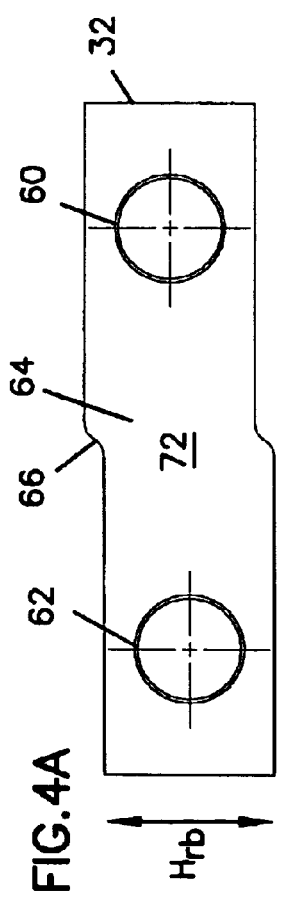
FIG. 4A is a front side view of a second outer reinforcing bar of the clamp of FIG. 1A.
Figure 4B:
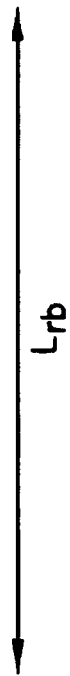
FIG. 4B is a top view of the outer reinforcing bar of FIG. 4A.
Figure 4C:
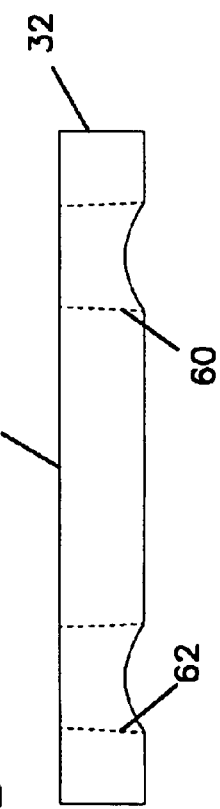
FIG. 4C is a backside view of the outer reinforcing bar of FIG. 4A.

The outer reinforcing bars 30 and 32 can be manufactured from a length of half-round steel or aluminum extrusions having a radius selected to correspond to the curvature of the concave pockets 44. To manufacture the outer reinforcing bars 30 and 32, the bolt openings 60 and 62 can be punched through the half-round steel with a conventional punch press. Before or after punching the holes 60 and 62, the offset 64 can be provided through the use of a press (i.e., a die forming process). The outer reinforcing bars 30 and 32 can be sheared to length either before or after the punching and pressing steps. The holes 60 and 62 have diameters that taper. For example, as shown at FIG. 3B, the diameters gradually reduce as the holes 60, 62 extend from surface 72 to surface 70.

c. Retaining Bar Description

Figure 5A:
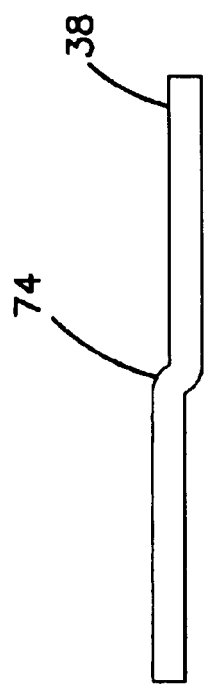
FIG. 5A is a side view of one of two retaining bars used by the clamp of FIG. 1A.
Figure 5B:
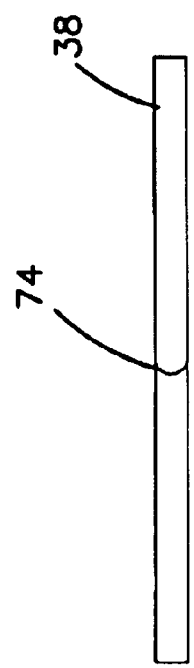
FIG. 5B is a top view of the retaining bar of FIG. 5A.
Figure 5C:
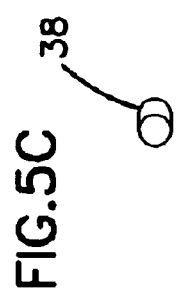
FIG. 5C is a left end view of the retaining bar of FIG. 5B.

FIGS. 5A–5C show one of the retaining bars 38 of the clamp 20. The depicted retaining bar 38 includes an intermediate step or offset 74 adapted to align with the step 50 of the band 22 when the clamp 20 is assembled. In one non-limiting embodiment, the retaining bar 38 is made from a length of steel or aluminum wire that has been cut to size and stamped or pressed to form the offset 74.

d. Sealing Bar Description

Figure 6B:
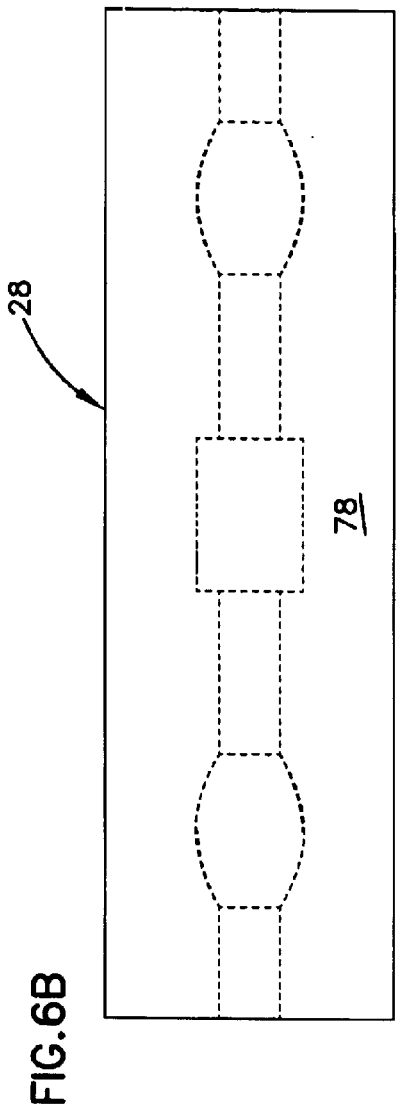
FIG. 6B is a top view of the sealing bar of FIG. 6A.
Figure 6A:
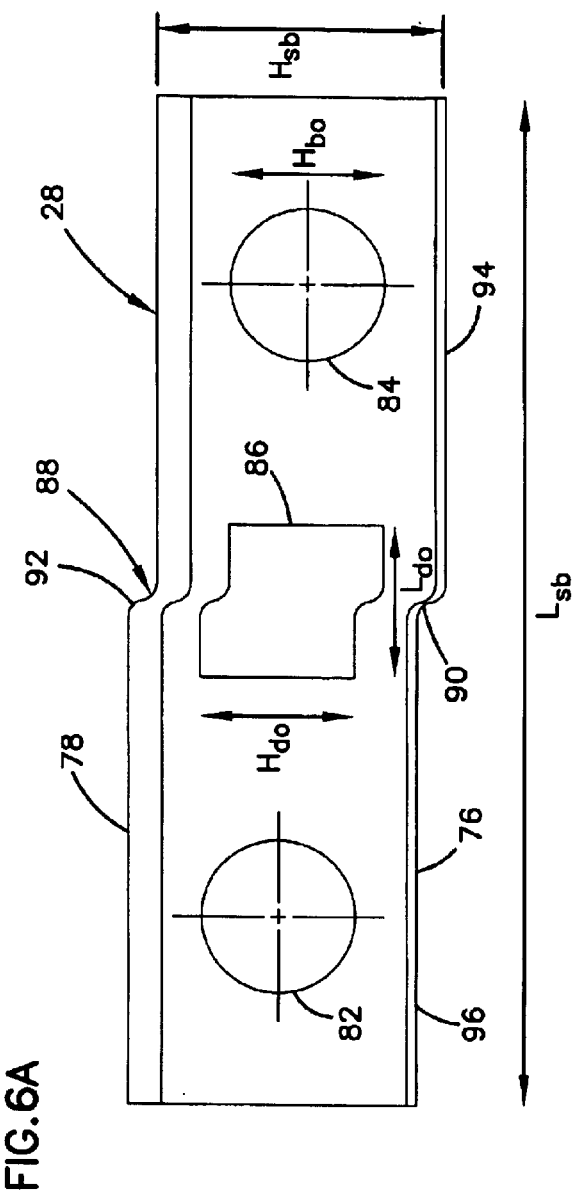
FIG. 6A is a side view of a sealing bar used by the clamp of FIG. 1A.
Figure 6C:
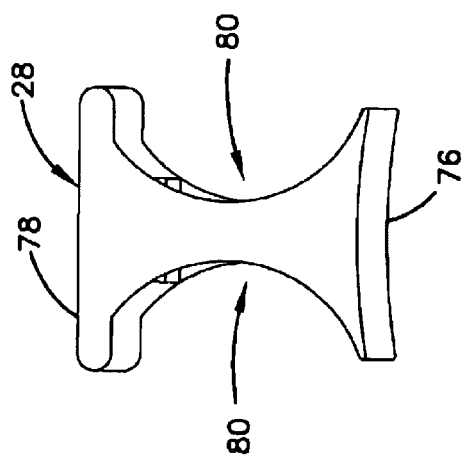
FIG. 6C is a left end view of the sealing bar of FIG. 6B.

FIGS. 6A–6C illustrate the sealing bar 28 in isolation from the clamp 20. The sealing bar 28 includes a length $L_{sb}$ and a height $H_{sb}$. The sealing bar 28 includes a sealing surface 76 and a reaction surface 78. The sealing surface 76 and the reaction surface 78 are separated by the height $H_{sb}$ by the sealing bar 28. When the clamp 20 is assembled, the sealing bar 28 is arranged such that the height $H_{sb}$ extends in a radial direction from the center line CL of the clamp 20. As so positioned, the sealing surface 76 blends generally with the curvature of the main body 24 of the band 22, and the reaction surface 78 is positioned immediately below the retaining bars 38. The sealing bar 28 defines outwardly facing concave pockets 80 (best shown in FIG. 6C) that receive the concave pockets 44 of the band 22 when the clamp 20 is assembled. The concave pockets 44 of the band 22 preferably nest within the concave pockets 80 of the sealing bar 28 (see FIG. 1A).

Referring to FIG. 6A, the sealing bar 28 defines bolt openings 82 and 84 adapted to respectively align with the bolt openings 46 and 48 of the bolt mounting flanges 26 when the clamp 20 is assembled. A deformation opening 86 is located between the bolt openings 82 and 84. The deformation opening 86 has a length $L_{do}$ and a height $H_{do}$. In a preferred embodiment, the ratio of the height $H_{do}$ to the length $L_{do}$ is in the range of 0.75 to 1.25. In a more preferred embodiment, the ratio of the height $H_{do}$ to the length $L_{do}$ is in the range of 0.9 to 1.1. In the most preferred embodiment, the ratio of the height $H_{do}$ to the length $L_{do}$ is about 1 to 1.

Referring still to FIG. 6A, the bolt openings and 82 and 84 each have a height $H_{do}$. Preferably, the $H_{do}$ of the deformation opening 86 is at least 50% of the height $H_{do}$ of the bolt openings 82 and 84. More preferably, the height $H_{do}$ of the deformation opening 86 is at least 75% as tall as the height $H_{do}$ of the bolt openings 82 and 84. Even more preferably, the height $H_{do}$ of the deformation opening 86 is at least 90% as tall as the height $H_{do}$ of the bolt openings 82 and 84. Most preferably, the height $H_{do}$ of the deformation opening 86 is about the same as the height $H_{do}$ of the bolt openings 82 and 84.

Referring still to FIG. 6A, the sealing bar 28 has an offset portion 88 located between the bolt openings 82 and 84. The offset portion 88 includes a first step 90 located at the sealing surface 76 and a second step 92 located at the reaction surface 78. The first and second steps 90 and 92 are adapted to align with the step 50 of the band 22. It will be appreciated that the first step 90 preferably is dimensioned to correspond generally to the height of the step 50 of the band 22. Thus, the sealing surface 76 includes a first portion 94 adapted to align generally with the smaller diameter portion 52 of the band 22 and a second portion 96 adapted to align with the larger diameter portion 54 of the band 22. The sealing surface 76 provides a smooth transition across the gap provided between the bolt mounting flanges 26 of the clamp 20.

The sealing bar 28 is preferably made of an extruded material such as extruded aluminum. To manufacture the bar, the extruded bar is punched to provide the bolt openings 82 and 84 and the deformation opening 86. The offset portion 86 is then provided through the use of a punch press (i.e., a forming die). Prior to forming the offset portion 88, the deformation opening 86 is preferably square or generally rectangular. The deformation opening 86 facilitates forming the offset portion 88 through the use of the punch press by providing a "weaker" location in the bar 28. After the offset portion 88 has been provided, the deformation 86 has an intermediate step that corresponds to the offset portion 88. The extrusion bar 28 can be cut to length either before or after the bar has been punched and stepped.

While it is preferred for the bar 28 to be extruded, other manufacturing techniques (e.g., casting) could also be used.

e. Description of Nut Bar and Fastener

Figure 7B:
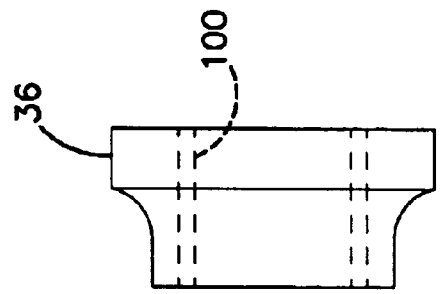
FIG. 7B is a right end view of the nut bar of FIG. 7A.
Figure 7A:
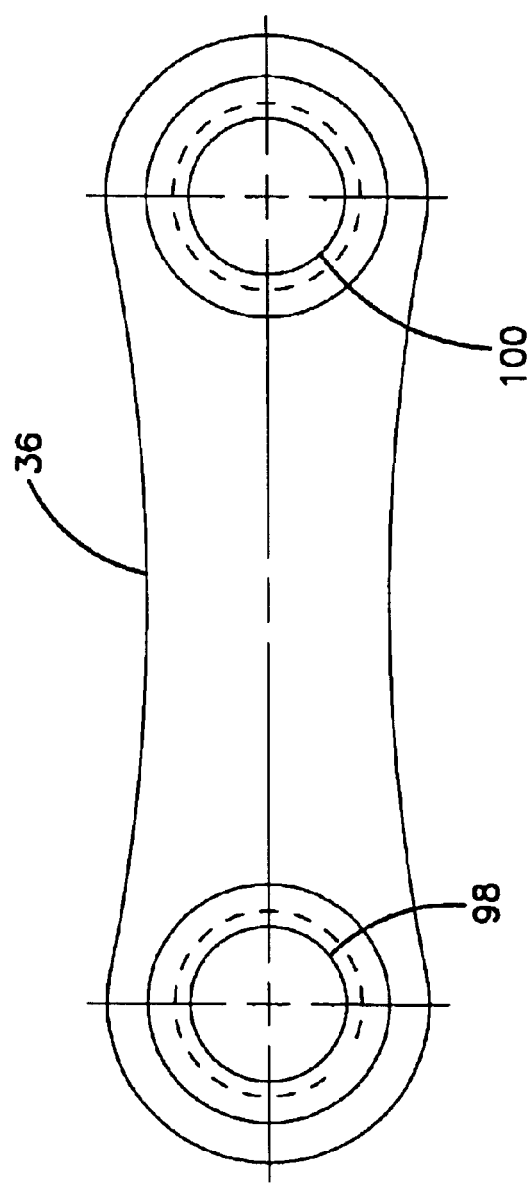
FIG. 7A is a side view of a nut bar used by the clamp of FIG. 1A.

FIGS. 7A and 7B illustrate the nut bar 36 of the clamp 20. The nut bar can be made of a material such as aluminum, steel or aluminized steel. Internally threaded openings 98 and 100 are preferably extruded and then tapped through the nut bar 36. The openings 98 and 100 are sized to threadingly receive the bolts 34 of the clamp 20. The openings 98 and 100 are positioned to respectively align with the bolt openings 46 and 48 of the band 22 when the clamp 20 is assembled.

Figure 8A:
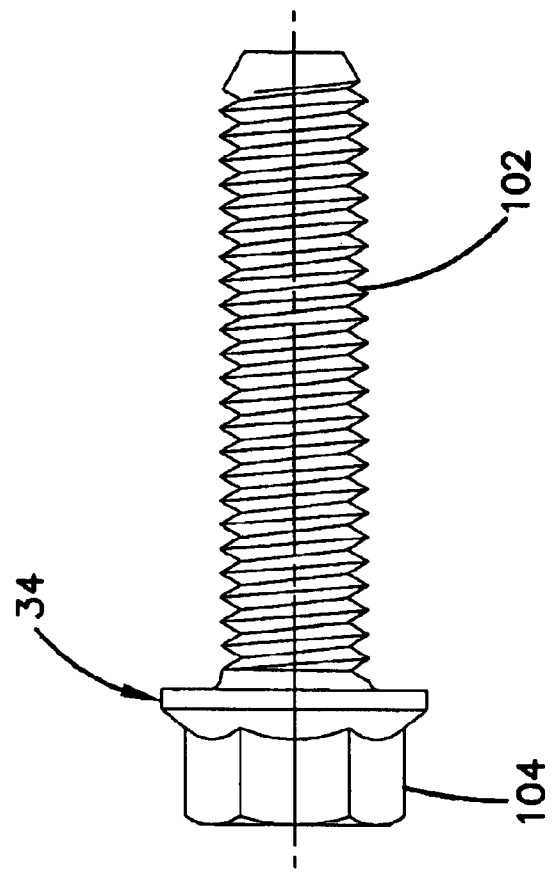
FIG. 8A illustrates one of two bolts used by the clamp of FIG. 1A.
Figure 8B:
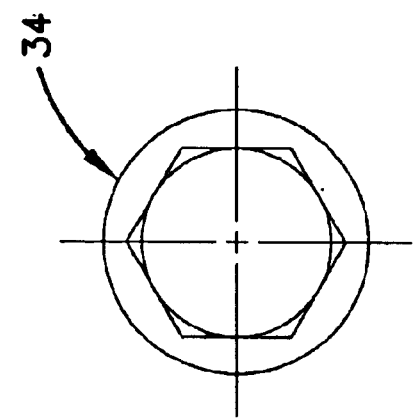
FIG. 8B is a left end view of the bolt of FIG. 8A.

FIGS. 8A and B show one of the bolts 34 of the clamp 20. The depicted bolt 34 has a threaded end 102 size to be threaded within the nut bar 36. A head 104 is located at one end of the bolt 34. When the clamp 20 is assembled, the head 104 butts against the outer reinforcing bar 32 and the nut bar 36 abuts against the outer reinforcing bar 30.

III. Manufacture of Clamp

Figure 9:
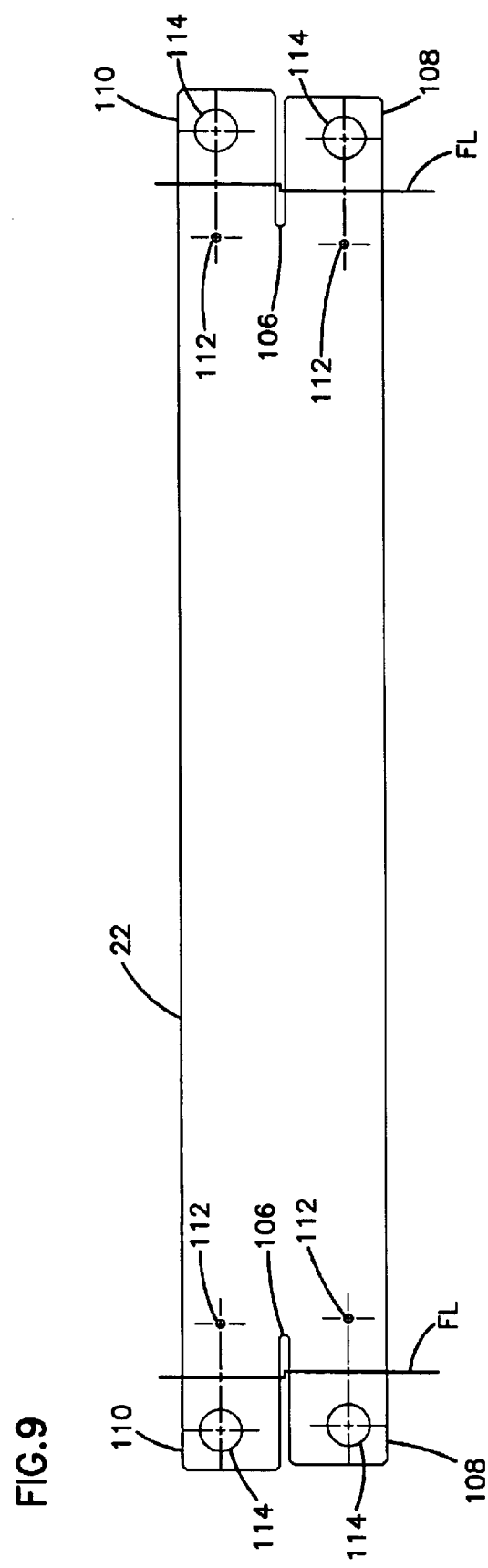
FIG. 9 is a plan view of a band prior to being formed into a band clamp as shown in FIG. 1A.

To manufacture the clamp 20, a strip of relatively thin (e.g., approximately 0.018 inches) material is provided. Preferred materials include stainless steel or aluminized steel. To initiate the manufacturing process, slots 106 are preferably punched into the ends of the strip as shown in FIG. 9. The slots 106 define first and second ears 108 and 110 located at each end of the band 22. The first ears 108 are shorter than the second ears 110. After punching the slots 106, relatively small extrusion holes 112 and large precursor bolt holes 114 are punched through the band 22. The holes 112 and 114 corresponding to the first ear 108 are staggered relative to the holes 112 and 114 defined by their corresponding ear 110.

After punching the holes 112 and 114, the ends of the band 22 are partially bent or "doubled over" at fold lines FL located between the holes 114 and the holes 112. After the ends of the band 22 have been partially bent, the pre-stepped retaining bars 38 are positioned along the fold lines FL and the fold is completed (e.g., by using a press). After folding, the openings 114 co-axially align with the openings 112. The slots 106 assist in aligning the openings 114 with the openings 112 during the folding process. It will be appreciated that the folded over portions at the ends of the band 22 form the bolt mounting flange 26 of the clamp 20.

After the ends of the band 22 have been folded to form the bolt mounting flanges 26, the flanges 26 are bent with a forming die to form the concave pockets 44. The outer reinforcing bars 30 and 32 are then placed within the pockets 44 and the holes 112 are punched outwardly through the openings 114 with a punch having a size corresponding to a clearance opening for the bolts 34. During the punching process, material corresponding to the inner wall 40 of each mounting flange 26 is extruded through the openings 114 and into the openings 60 and 62 of the outer reinforcing bars 30 and 32 (see FIG. 2D). By extruding portions of the inner wall 40 into the bolt opening 60 and 62, the outer reinforcing bars 30 and 32 are fastened or fixed to the bolt mounting flange 26.

After the outer reinforcing bars 30 and 32 have been connected to the band 22, the band 22 is wrapped around a cylindrical mandrel. A spacer piece having a size corresponding to the sealing bar 28 is mounted between the bolt mounting flanges 26 and a clamp is used to tighten the band 22 about the mandrel. The mandrel preferably has a split collet arrangement that engages a portion of the band 22 that will later be the enlarged diameter portion 54 of the band 22. By expanding the split collet arrangement, the portion of the band 22 corresponding to the larger diameter portion 54 is expanded outwardly. As the collet expands, the enlarged diameter portion 54 deforms while the reduced diameter portion 52 maintains about the same diameter. The step 50 is formed at the edge of the split collet and provides a transition from the larger diameter portion 54 to the smaller diameter portion 52.

Once the step 50 has been formed, the band 22 is removed from a mandrel and the sealing bar 28 having the preformed offset portion 88 is inserted between these bolt mounting flanges 26. The bolts 34 are then inserted through the openings 60 and 62 of the outer reinforcing bars 30 and 32, the openings 46 and 48 of the mounting flanges 26 and the openings 82 and 84 of the sealing bar 28. Once so inserted, the bolts 34 are threaded within the nut bar 36 located adjacent to the outer reinforcing bar 32. In this manner, the bolts 34 fasten the bolt mounting flanges 26 together. As so fastened, the retaining bars 36 are positioned above the outer reinforcing bars 30 and 32 and the reaction surface 78 of the sealing bar 28.

When the clamp 20 is tightened about a lap joint, the retaining bars 38 are drawn down against the reinforcing bars 30 and 32 and the reaction surface 78 of the sealing bar 28. The retaining bars 38 are too large to fit between the relatively narrow gaps formed between the reinforcing bars 30 and 32 and the reaction surface 78 of the sealing bar 28. Thus, the retaining bars 38 prevent the bolt mounting flanges 26 from tearing at the bolt openings 46, 48 and slipping between the sealing bar 28 and the outer reinforcing bars 30 and 32.

IV. Use of Clamp

Figure 10:
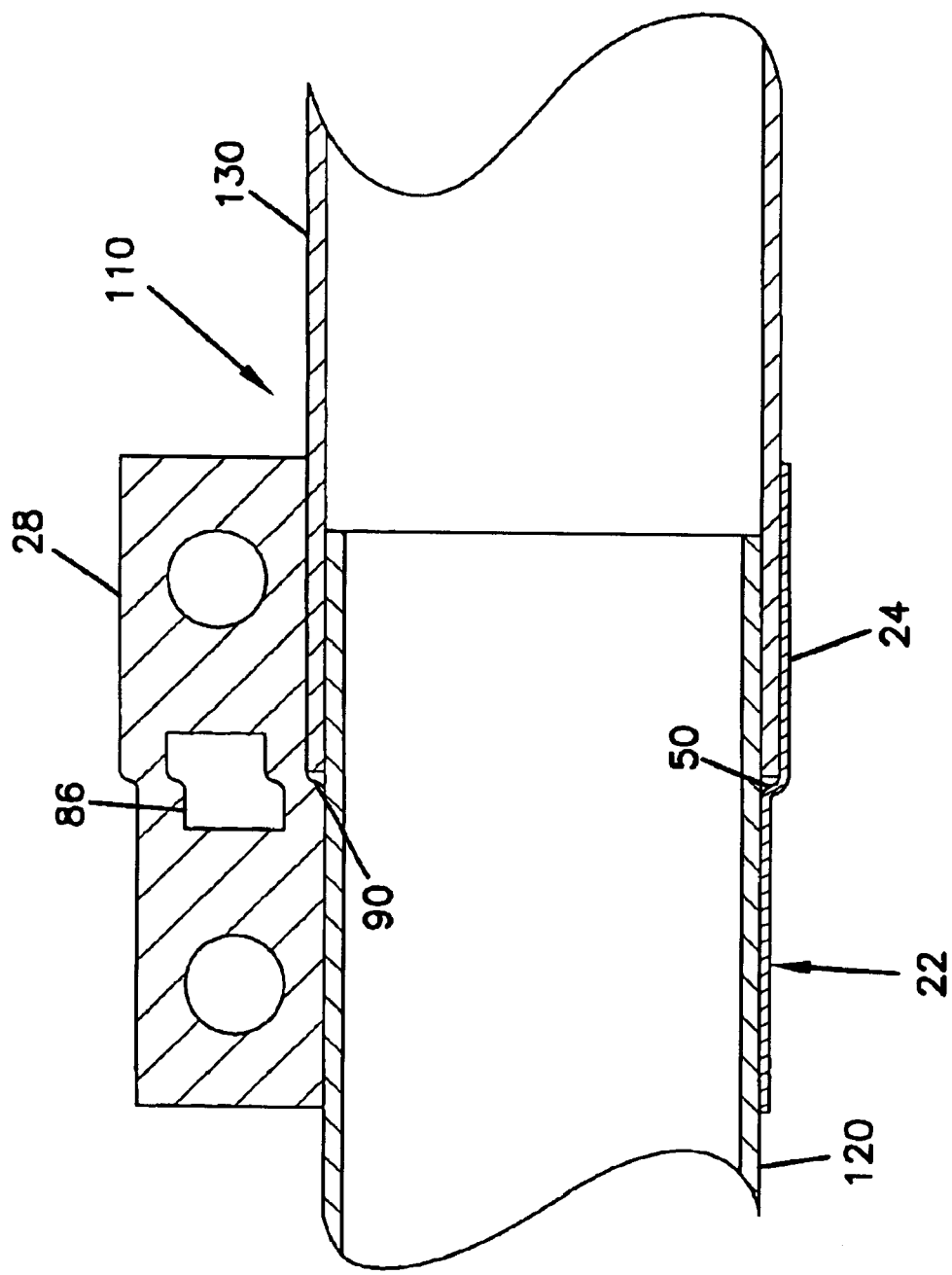
FIG. 10 shows the clamp of FIGS. 1A–1C being used to seal a lap-joint.

FIG. 10 shows the clamp 20 being used to seal a lap joint 110. As shown in FIG. 10, the first step 90 of the sealing bar 28 conforms to the step provided between two conduits such as inner pipe 120 and outer pipe 130. Similarly, the step 50 provided in the band 22 also conforms to the step between inner pipe 120 and outer pipe 130. The deformation opening 86 allows the sealing bar 28 to deform more or less greatly at the first step 90 if the step between the lap joint pipes 120 and 130 is different than the pre-formed step provided in the sealing bar 28.

It will be appreciated that the initial step 90 provided in the sealing bar 28 is a factory manufactured step. The term "factory manufactured step" means that the step was provided prior to actually using the clamp 20 at a lap joint. A factory manufactured step is preferably made to relatively precise manufacturing tolerances.

V. Other Embodiments

In the previously discussed embodiment, the step 50 is preferably defined along substantially the entire main body 24 of the band 22. The step 50 and the step 90 of the sealing bar 28 cooperate to provide substantially a 360 degree seal about a lap joint.

It will be appreciated that in alternative embodiments the band 22 may not include a pre-formed step such as step 50. Instead, due to the inherent deformability of the material forming the band 22, the step 50 can be provided through deformation in the field. Further, in some embodiments, it may be desirable to provide a pre-formed step 50 along only a portion of the main body 24. Moreover, to promote ease of shipping, it may be desirable to ship the clamp 20 while the main body 24 is in a generally flat configuration. With this type of arrangement, an end user would bend the clamp into the generally cylindrical configuration as the clamp is being used to seal a lap joint.

a) Clamp Having Band Without Pre-formed Curve or Pre-formed Step

FIGS. 11A and 11B show an exemplary clamp 20' that does not have a pre-formed step 50 and is preferably shipped with the main body 24 of the band 22 in a generally flat configuration. The clamp 20' preferably includes the same fastening hardware as the clamp 20 of FIGS. 1A–1C.

b) Clamp Having Band With Pre-formed "S" Shape

Figure 12A:
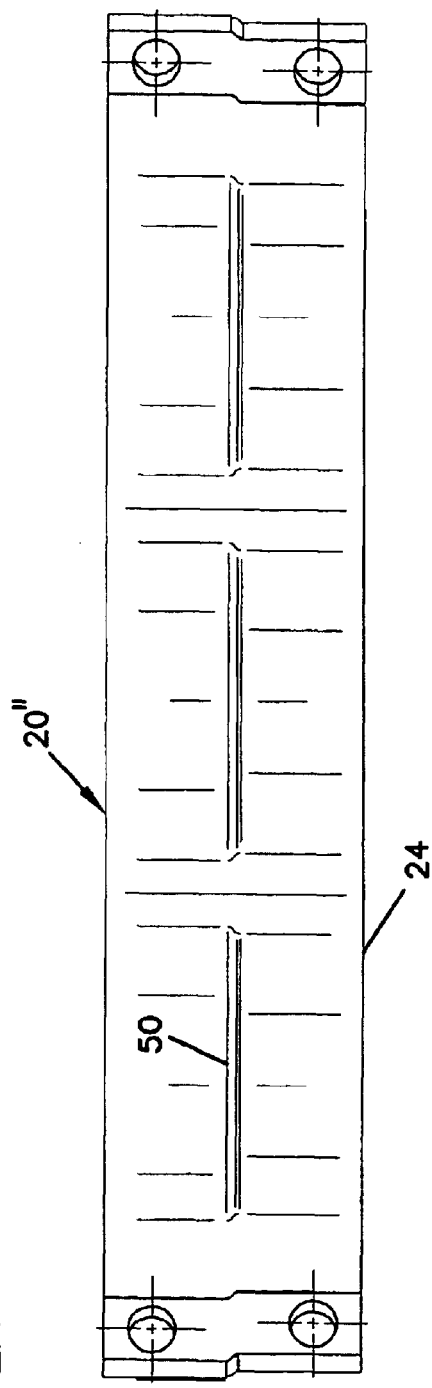
FIGS. 12A and 12B illustrate another alternative clamp that is an embodiment of the present invention.
Figure 12B:
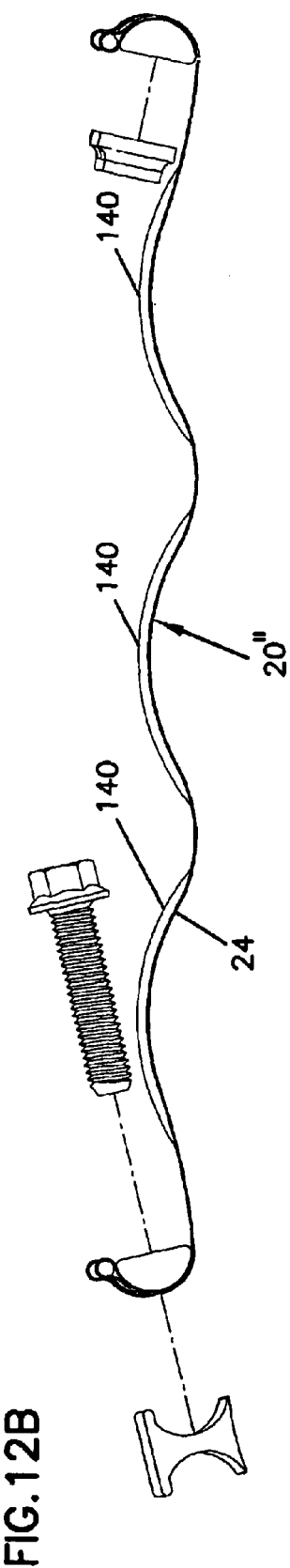

FIGS. 12A and 12B show a clamp 20" that is another embodiment of the present invention. The main body 24 of the band has an S-shaped curvature similar to the curvatures shown in U.S. Pat. No. 4,790,574, that is hereby incorporated by reference. The S-shaped curvature defines three curved humps 140. A pre-form step 50 is formed along only a portion of the length of the main body 24. The humps 140 assist an end user in wrapping the clamp 20" about a lap joint. The clamp 20" preferably includes the same fastening hardware as the clamp 20 of FIGS. 1A–1C.

c. Modified Sealing Bar

FIGS. 13–17 illustrate a sealing bar 28' that is an embodiment of the present invention. The sealing bar 28' is adapted for use with any of the clamps 20, 20' or 20" previously described herein. It will also be appreciated that the sealing bar 28' could also be used with clamps other than those specifically described herein such as clamps having a configuration similar to the clamps disclosed in U.S. Pat. No. 4,312,526 to Cassel.

The sealing bar 28' has many of the same structural features as the sealing bar 28 that was previously described. To avoid repetition, components previously described with respect to the sealing bar 28 will be assigned the same reference numeral.

The sealing bar 28' will be described with reference to clamp 20. However, as indicated above, the sealing bar 28' is also applicable to any number of different types of clamps.

The sealing bar 28' includes length $L_{sb}$ and height $H_{sb}$. The sealing bar 28' also includes sealing side 76 and reaction side 78 separated by the height $H_{sb}$. When the sealing bar 28' is assembled with the clamp 20, the sealing bar 28' is arranged such that the height $H_{sb}$ extends in a radial direction from the center line of the clamp 20. As so positioned, the sealing side 76 blends generally with the curvature of the main body 24 of the flange 22, and the reaction side 78 is positioned immediately below the retaining bars 38. The sealing bar 28' defines outwardly facing concave pockets 80 that receive the concave pockets 44 of the flanges 26 when the clamp 20 is assembled. The concave pockets 44 of the flanges 26 preferably nest within the concave pockets 80 of the sealing bar 28'. The sealing bar 28' further defines bolt openings 82 and 84 adapted to respectively align with the bolt openings 46 and 48 of the bolt mounting flanges 26 when the clamp 20 is assembled.

Each of the concave pockets 80 is defined by a scaling leg 200 and an opposing reaction leg 210. While the pockets 80 have been described as concave, it will be appreciated that other shaped pockets could also be used. For example, pockets formed by a plurality of linear segments could also be used.

To enhance deformation of the sealing bar 28', the reaction side 78 includes a relief structure for facilitating deformation of the reaction legs 210 as the clamp 20 is tightened. Preferably, the relief structure is configured to allow the reaction legs 210 to deform slightly toward one another as the clamp 20 is tightened (see arrows 212 of FIG. 17 which illustrate the direction of deformation). The relief structure allows the reaction legs 210 to deform without requiring excessive clamping pressure. The deformation of the reaction legs 210 allows the sealing side 76 to better seat on the conduits being clamped such that a better seal is provided. As is apparent from FIG. 17, the reaction legs 210 include flats 219 that facilitate deformation of the legs 210. When the bolts 34 are tightened to close the clamp, convex surfaces 72 of reinforcing bars 30, 32 as well as the concave pockets 40 of the flanges 26 are pressed within the pockets 80 of the sealing bar 28'. To accommodate the reinforcing bars 30, 32 and the pockets 40 within the sealing bar pockets 80, the flats 219 deflect outwardly along arrows 217.

Figure 13:
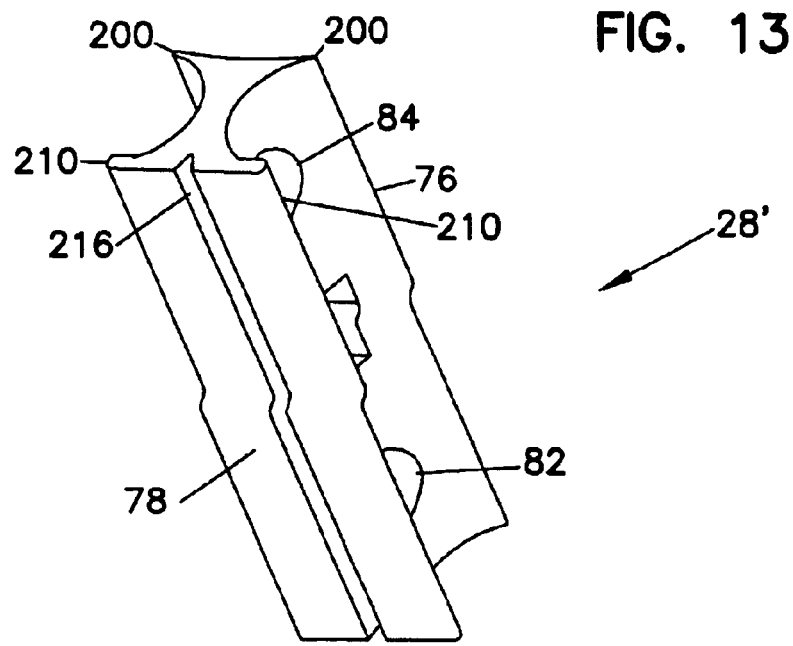
FIG. 13 is a perspective view of a modified sealing bar that is an embodiment of the present invention, the sealing bar is adapted for use with any of the above-described clamps.
Figure 14:
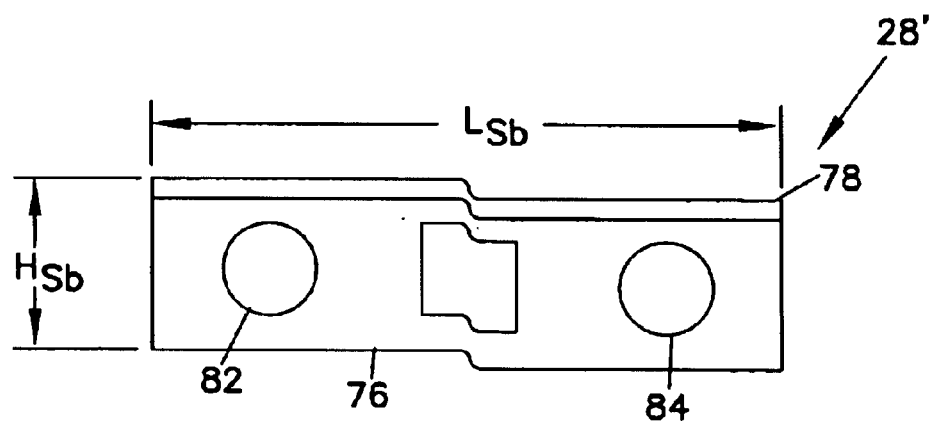
FIG. 14 is a side view of the sealing bar of FIG. 13.

As best shown in FIGS. 13, 15 and 16, the depicted relief in the sealing side 76 of the sealing bar 28' includes a notch 216. The notch 216 is shown having a generally triangular transverse cross-section. The notch 216 is positioned in alignment with a center line of the sealing bar 28' and extends along the length of the sealing bar 28'. As shown in FIG. 17, the notch 216 provides a relief area for facilitating deformation of the reaction legs 210. The legs 210 deflect in the direction of arrows 217. When the reaction legs 210 deform, the notch 216 at least partially closes (see phantom line in FIG. 17).

While the relief notch 216 has been shown having a generally triangular or V-shaped transverse cross-section, it will be appreciated that other cross-sections such as rectangular, rounded, U-shaped, semi-circular or other shapes could also be used. The closure of the notch during tightening can be either partial or complete. Also, the degree of closure of the notch can be used as an installation indicator to indicate proper bolt tightening.

d. Clamp With Structure For Retaining Reinforcing Bars in Flange Pockets

FIGS. 18–21 show another clamp 220 having features that are examples of inventive aspects conceived by the inventors. The 220 clamp includes the sealing bar 28' of FIGS. 13–17. The clamp 220 also includes many of the same components as the clamp 20 of FIGS. 1A–1C. For example, the clamp 220 includes band 22 having flanges 26 defining pockets 40. The clamp 220 also includes outer reinforcing bars 30, 32 received in the pockets 40, and a fastening arrangement including nut bar 36 and two bolts 34. The flanges 26 of the clamp 220 are formed by doubling the ends of the band 24 over retaining bars 38 to provide inner and outer walls 41, 42 (see FIG. 21) at the flanges 26. The clamp 220 also includes structure for holding the outer reinforcing bars 30, 32 in the flange pockets 40 when the bolts 34 are not in place. As shown in FIGS. 18–22, the structure includes retaining portions 223 of the outer walls 42 of the flanges 26 that extend around the undersides of the outer reinforcing bars 30, 32 and project upwardly so as to oppose the flat outer surfaces 70 of the outer reinforcing bars 30, 32. The retaining portions 223 function to trap or capture the outer reinforcing bars 30, 32 within the pockets 40 of the flanges 26. As shown in FIGS. 18–21, the portions 223 include generally triangular tabs located adjacent the ends of the outer reinforcing bars 30, 32. Of course, other shaped structures could also be used. It will be appreciated that the clamp 220 can be manufactured in the same way described with respect to the clamp 20 of FIGS. 1A–1C, with the retaining portions 223 being bent upwardly to the retaining/trapping position after the outer reinforcing bars 30, 32 have been placed in the pockets 40.

e. Clamps Without Retaining Bars

FIGS. 22–25A show a clamp 320 having features that are examples of inventive aspects conceived by the inventors. The clamp 320 includes a sealing bar 28a that is the same as the sealing bar 28' of FIGS. 13–17 except the flats 219 have been replaced with curved surfaces 219a(see FIG. 25a). The curved surfaces 219a cooperate with curved surfaces 221a to define pockets 80a of the sealing bar 28a. The curved surfaces 219a, 221a have the same radiuses of curvature, but are arced about centerpoints that are offset from one another prior to tightening of the clamp and deformation of reaction legs 210a of the sealing bar 28a.

Figure 24:
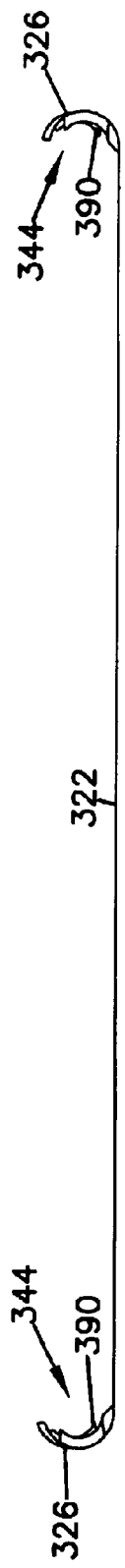
FIG. 24 is an elevational view of the strap of FIG. 23 after pockets have been formed therein.
Figure 25:
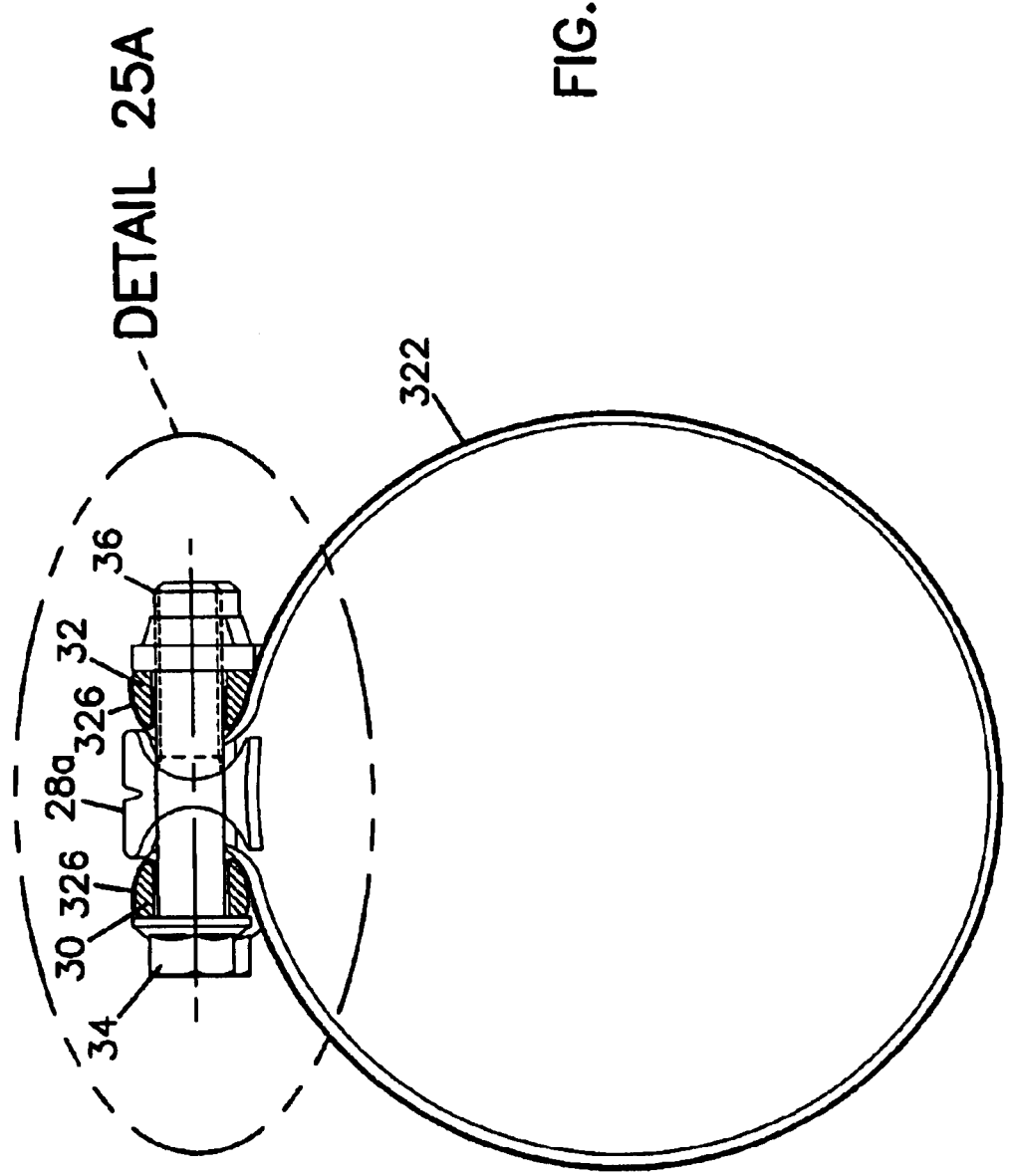
FIG. 25 is a partial cross-sectional view of the clamp of FIG. 22 in an assembled configuration.
Figure 25A:
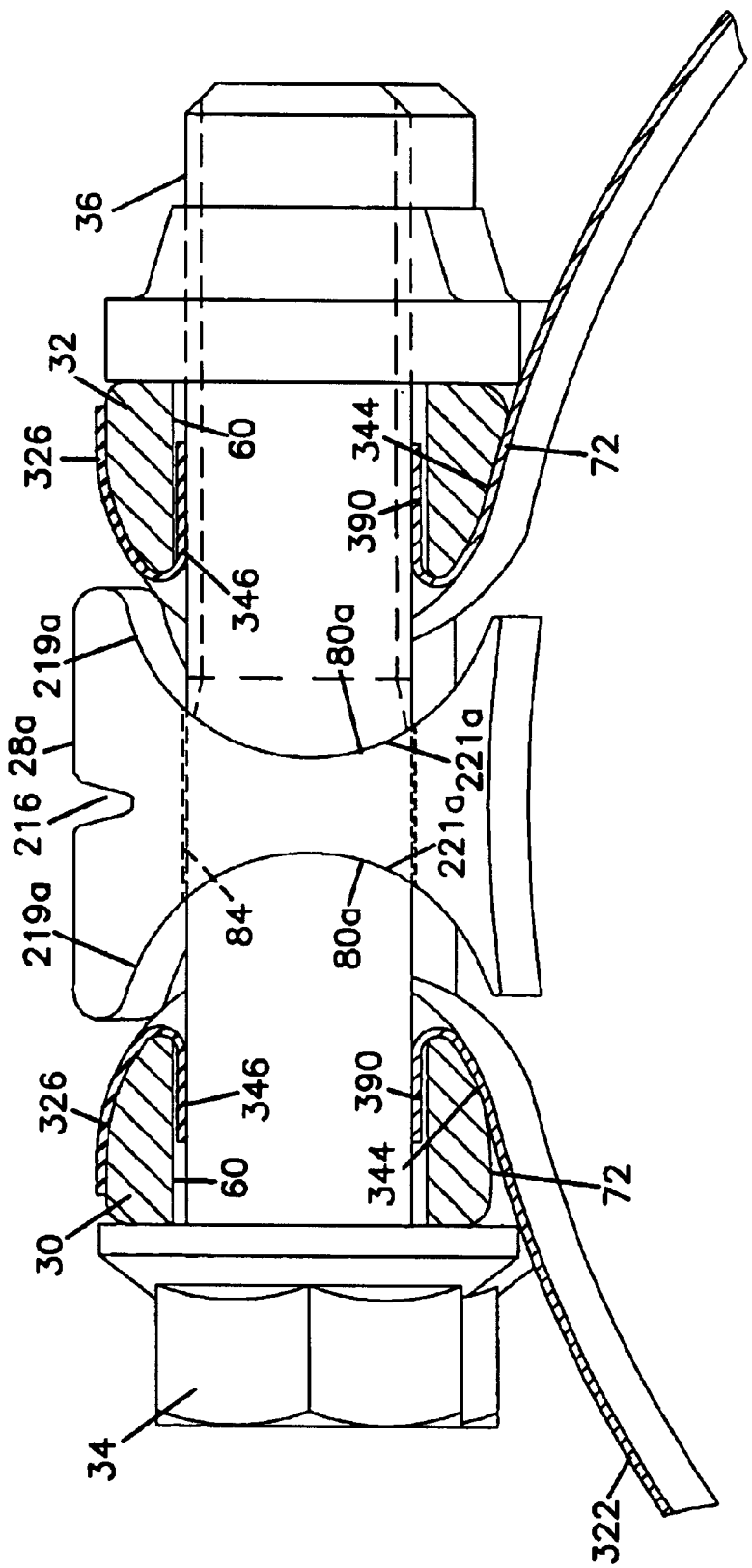
FIG. 25A is a detailed view of a portion of FIG. 25.
Figure 27:
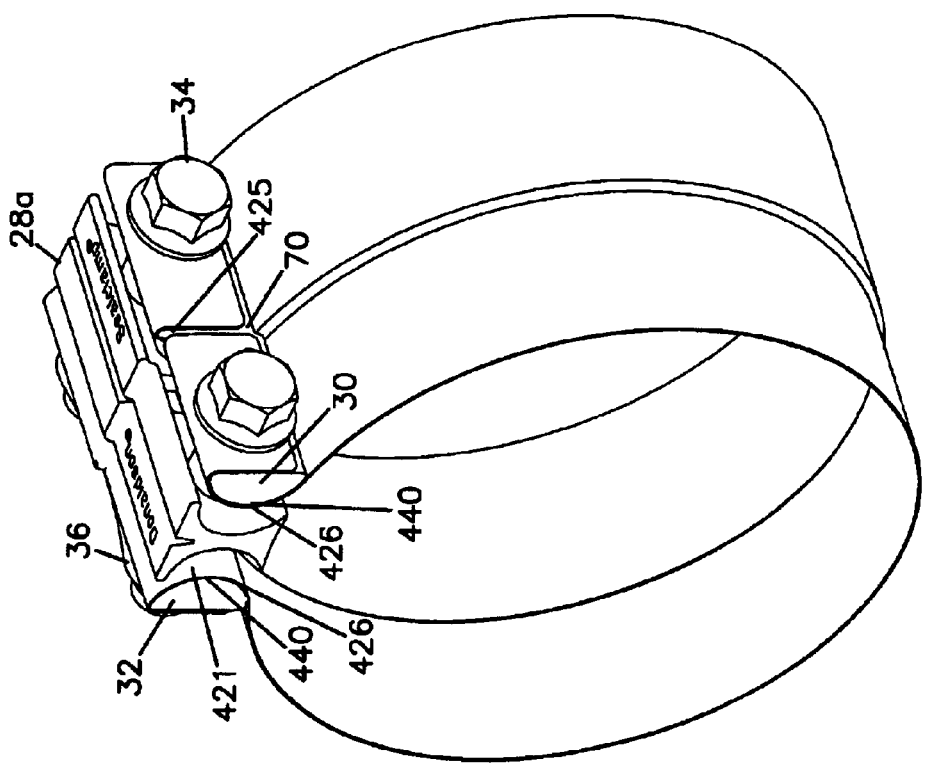
FIG. 27 is another perspective view of the clamp of FIG. 26.
Figure 26:
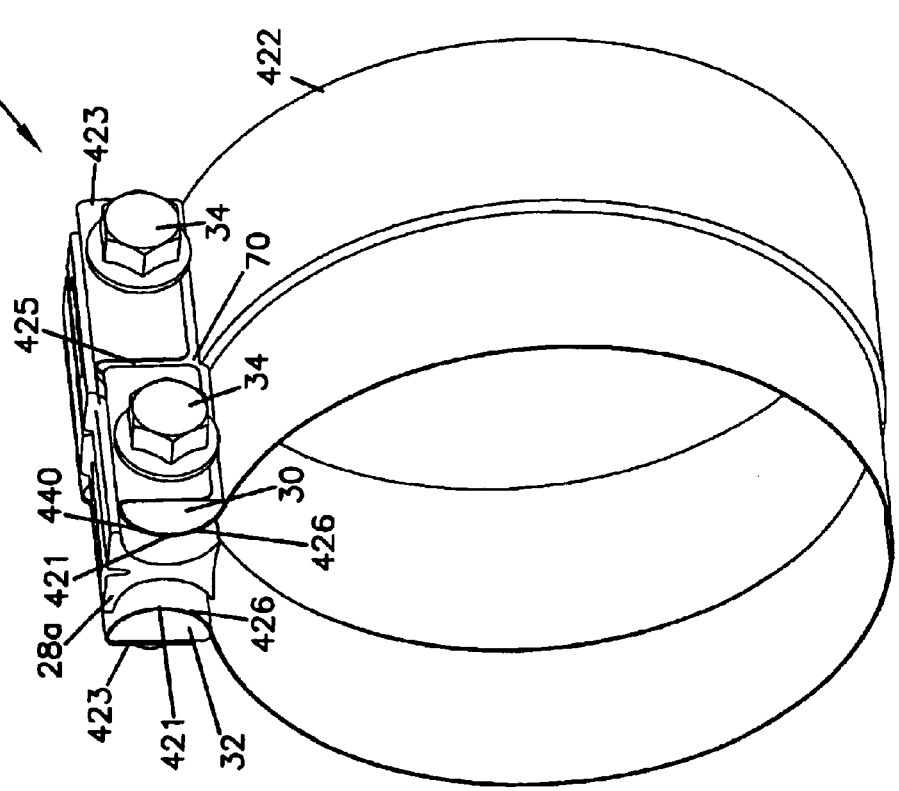
FIG. 26 is a perspective view of a further clamp having features that are examples of inventive aspects disclosed herein.

Similar to the clamp 20 of FIGS. 1A–1C, the clamp 320 also includes outer reinforcing bars 30, 32, bolts 34 and nut bar 36. Unlike the clamp 20 of FIGS. 1A–1C, the clamp 320 does not include retaining bars 38 over which the band is doubled over to form a mounting flange having a double-wall portion. Instead, the clamp 320 includes a band 322 having mounting flanges 326 defined by a single thickness or a single layer of the band 322. As best shown in FIGS. 24, 25 and 25A, the mounting flanges 326 define outwardly facing concave pockets 344 that receive the convex surfaces 72 of the outer reinforcing bars 30, 32. The flanges 326 fit within the pockets 80a of the sealing bar 28a. In use, the single layers forming the pockets 344 of the band 322 extend between the sealing bar 28a and the outer reinforcing bars 30, 32 (see FIGS. 25 and 25A). When the clamp is tightened, the reaction legs 210a deflect to accommodate the flanges 326 and the bars 30, 32 within the pockets 80a. As the reaction legs 210a deflect, notch 216 on the sealing bar 28a closes and the centerpoints of the curved surfaces 219a, 221a move toward one another. In a preferred embodiment, the curved surfaces 219a and 221a share a common centerpoint when the clamp is fully tightened.

Figure 23:
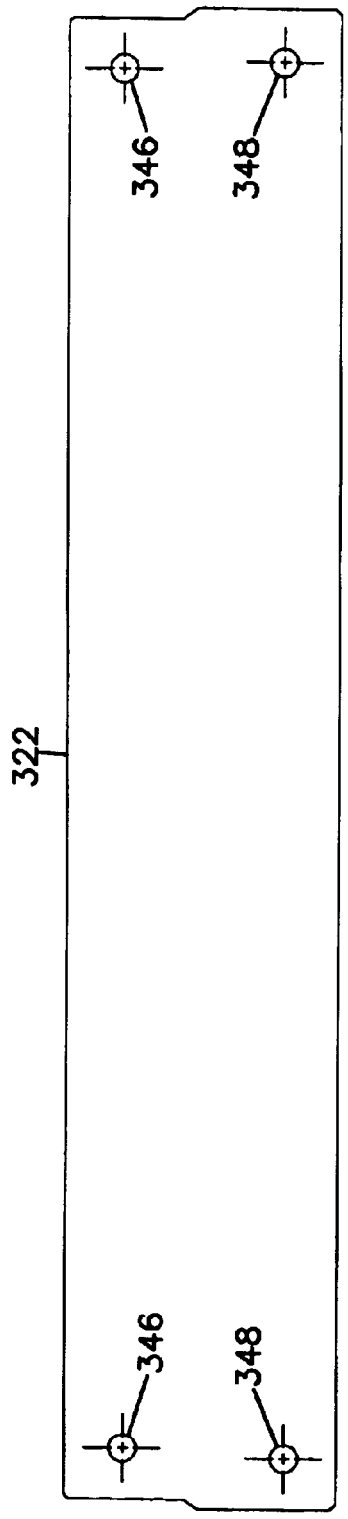
FIG. 23 is a plan view of the band/strap of the clamp of FIG. 22 prior to pockets being formed therein.

Referring to FIGS. 22 and 23, the band 322 includes two sets of bolt openings 346, 348. The bolt openings 346, 348 are staggered relative to one another to align with openings 60, 62 of the bars 30, 32 and openings 84, 82 of the sealing bar 28a. The bolt openings 346, 348 are preferably formed through a punching process that generates outwardly extending projections 390 (see FIGS. 24, 25 and 25A) that surround each of the bolt openings 346, 348 and project into the concave pockets 344. The projections 390 can also be referred to as "extension portions" or "necked portions." During the manufacturing process, the projections 390 can be extruded into the corresponding openings 60, 62 defined by the outer reinforcing bars 30, 32 (see FIG. 25A where openings 60 are depicted). It will be appreciated that projections 390 corresponding to openings 348 extend into openings 62 in a similar manner and therefore have not been separately depicted. By extruding or otherwise extending the projections 390 into the openings 60, 62 of the reinforcing bars 30,32, the openings 346, 348 of the band 322 resist tearing when the clamp 320 is tightened about a conduit.

In an alternative embodiment, the ends of the band 322 can be bent around a curved manufacturing tool to form the pockets 344. The curved manufacturing tool can include openings into which the projections 390 are punched during formation of the openings 346, 348. After the openings 346, 348 have been punched, the manufacturing tool is removed and the reinforcing bars 30, 32 are inserted in the pockets 344 with the projections 390 extending into the openings 60, 62 of the bars 30, 32.

It will be appreciated that the band 322 can be pre-formed into a generally cylindrical shape, or could have a flat configuration as shown in FIG. 22. The band 322 is preferably made of a relatively thin, ductile metal material such as stainless steel or aluminized steel. In one non-limiting embodiment of the present invention, the band 322 is made of stainless steel and has a wall thickness in the range of 0.013–0.023 inches.

FIGS. 26–28A show another clamp 420 having features that are examples of inventive aspects conceived by the inventors. The clamp 420 lacks retaining bars 38 and has many of the same components as the clamp 320. For example, the clamp 420 includes sealing bar 28a, outer reinforcing bars 30, 32, bolts 34 and nut bar 36. A band 422 of the clamp has been modified to include retaining portions 423 that wrap over top sides of the of the outer reinforcing bars 30, 32 and oppose the flat sides 70 of the reinforcing bars 30, 32 to retain the bars 30, 32 within pockets 440 defined by flanges 426 of the band 422. The ends of the band 422 include slits 425 that facilitate bending the retaining portions 423 in a conformed manner over the stepped outer reinforcing bars 30, 32. A single thickness or layer 421 of the band 422 extends between the sealing bar 28a and each of the outer reinforcing bars 30, 32. As shown in FIGS. 28 and 28A, the band 422 include outwardly necked portions 490 that project into the inside ends of the openings 60 of the outer reinforcing bars 30, 32, and inwardly necked portions 491 that project into the outside ends of the openings 60 of the outer reinforcing bars 30, 32. Preferably, similar necked portions project into the other openings 62 defined by the outer reinforcing bars 30, 32. The outwardly necked portions 490 are integral with the layer 421, and the inwardly necked portions 491 are integral with the retaining portions 423.

By way of example, certain of the above clamp embodiments can include bands having a thickness in the range of 0.013–0.033 or 0.018–0.025 inches. Of course, the thickness will vary with intended use and other thicknesses are also contemplated. Also, any of the above embodiments disclosed herein can be packaged in a flat configuration as shown in FIGS. 11A and 11B, or a dipped configuration as shown in FIGS. 12A and 12B. Moreover, any of the embodiments disclosed herein can be used in combination with a sealing gasket as disclosed in U.S. patent application Ser. No. 10/387,705, entitled Sealing Gasket for a Clamp, filed on Mar. 13, 2003, which is hereby incorporated by reference in its entirety.

With regard to the foregoing description, it is to be understood that changes may be made in detail, especially with respect to the construction materials employed and the shape, size and arrangement of the parts without departing from the scope of the present invention. It is intended that the specification and depicted aspects be considered illustrative only with a true scope end spirit of the invention being indicated by the broad meaning of the following claims.

We claim:

1. A clamp comprising:
a band including a main body and bolt mounting flanges located at opposite ends of the main body, the bolt mounting flanges each having a length and a height, the bolt mounting flanges each including first and second bolt openings spaced-apart along the length of each bolt mounting flange; and
a sealing bar mountable between the bolt mounting flanges of the band, the sealing bar including a length and a height, the sealing bar including first and second bolt openings adapted to respectively align with the first and second bolt openings of the bolt mounting flanges, the sealing bar including a sealing side and a reaction side separated by the height of the sealing bar, the sealing bar further including outwardly facing pockets adapted to receive portions of the bolt mounting flanges, each pocket being defined by a sealing leg and an opposing reaction leg of the sealing bar, the reaction side of the sealing bar including a relief for facilitating deformation of the reaction legs during tightening of the clamp.

2. The clamp of claim 1, wherein:
the bolt mounting flanges are defined by doubled over portions of the band, the doubled over portions being adapted to fit within the pockets of the sealing bar and to define flange pockets; and
wherein the pipe clamp further comprises:
retaining bars around which the band is bent to form the doubled over portions of the mounting flanges; and
outer reinforcing bars mountable in the flange pockets, each of the outer reinforcing bars having a length and a height, each of the outer reinforcing bars including first and second bolt openings that are spaced-apart along the length of each outer reinforcing bar and are adapted to respectively align with the first and second bolt openings of the bolt mounting flanges.

3. The clamp of claim 2, wherein the pockets of the sealing bar are concave, wherein the flange pockets are concave, and wherein the outer reinforcing bars include convex portions that fit within the flange pockets.

4. The clamp of claim 1, wherein the relief includes a notch defined in the reaction surface of the sealing bar.

5. The clamp of claim 4, wherein the notch extends along the length of the sealing bar.

6. The clamp of claim 5, wherein the notch is aligned with a centerline of the sealing bar.

7. The clamp of claim 4, wherein the notch includes a generally triangular cross-section.

8. The clamp of claim 4, wherein the notch closes as the reaction legs deflect.

9. The clamp of claim 1, further comprising outer reinforcing bars that compress the bolt mounting flanges within the pockets of the sealing bars when the clamp is tightened.

10. The clamp of claim 9, wherein the outer reinforcing bars include convex surfaces that face toward the pockets of the sealing bar.

11. The clamp of claim 1, wherein the pockets of the sealing bar enlarge as the reaction legs deflect.

12. A clamp comprising:
a band including a main body and bolt mounting flanges located at opposite ends of the main body, the bolt mounting flanges each having a length and a height, the bolt mounting flanges each including first and second bolt openings spaced-apart along the length of each bolt mounting flange; and
a sealing bar mountable between the bolt mounting flanges of the band, the sealing bar including a length and a height, the sealing bar including first and second bolt openings adapted to respectively align with the first and second bolt openings of the bolt mounting flanges, the sealing bar including a sealing side and a reaction side, the sealing side being separated from the reaction side by the height of the sealing bar, the sealing bar including a relief notch located at the reaction side of the sealing bar.

13. The clamp of claim 12, wherein the relief notch extends along the length of the sealing bar.

14. The clamp of claim 12, wherein the relief notch has a generally triangular cross-section.

15. A clamp comprising:
a sealing bar including first and second sides that face in opposite directions, the sealing bar defining pockets positioned between the first and second sides, the pockets facing in opposite directions, the pockets being defined by first legs positioned adjacent the first side and second legs positioned adjacent the second side, the sealing bar including a relief at the first side for facilitating deformation of the first legs; and a band having portions adapted to be received in the pockets of the sealing bar.

16. A clamp comprising:

a band having a main body and outwardly facing pockets, the band defining fastener openings at the outwardly facing pockets;

a sealing member that mounts between the outwardly facing pockets of the band, the sealing member having fastener openings that align with the fastener openings of the band;

reinforcing members that mount in the outwardly facing pockets of the band, the reinforcing members having fastener openings that align with the fastener openings of the band;

the band including extension portions that extend into the fastener openings of the reinforcing members; and the pockets of the band each being defined by a single layer of the band, each single layer extending between the sealing member and a corresponding one of the reinforcing members.

17. The clamp of claim 16, wherein the extension portions of the band are extruded into the fastener openings of the reinforcing members.

18. The clamp of claim 16, wherein the extension portions define at least portions of the fastener openings of the band.

19. The clamp of claim 16, wherein the reinforcing members include inner surfaces that face toward the sealing member and outer surfaces that face away from the sealing member, and wherein the band includes retaining portions that wrap around the reinforcing members and oppose at least portions of the outer surfaces of the reinforcing members.

20. The clamp of claim 19, wherein the extension portions include outwardly necked portions that extend outwardly into the fastener openings of the reinforcing members and inwardly necked portions that extend inwardly into the fastener openings of the reinforcing members.

21. A clamp comprising:

a band having a main body and outwardly facing pockets, the band defining fastener openings at the outwardly facing pockets;

a sealing member that mounts between the outwardly facing pockets of the band, the sealing member having fastener openings that align with the fastener openings of the band, the sealing member having outwardly facing pockets that receive the pockets of the band;

reinforcing members that mount in the outwardly facing pockets of the band, the reinforcing members having fastener openings that align with the fastener openings of the band, the reinforcing members including inner sides that face toward the pockets of the band and outer sides that face away from the pockets of the band; and the band including retaining portions that wrap around the reinforcing members and oppose at least portions of the outer sides of the reinforcing members.

22. The clamp of claim 21, wherein the inner sides of the reinforcing members are convex.

23. The clamp of claim 21, wherein the pockets of the band are defined by doubled over portions of the band that extend between the reinforcing members and the sealing member, and wherein the pipe clamp further comprises retaining bars around which the band is bent to form the doubled over portions of the mounting flanges.

24. The clamp of claim 23, wherein the retaining portions comprise tabs.

* * * * *